(12) United States Patent
Morgan

(10) Patent No.: US 11,529,908 B2
(45) Date of Patent: Dec. 20, 2022

(54) HITCHABLE APPARATUS FOR USE WITH VEHICLES

(71) Applicant: William Morgan, Belgrade, MT (US)

(72) Inventor: William Morgan, Belgrade, MT (US)

(*) Notice: Subject to any disclaimer, the term of this patent is extended or adjusted under 35 U.S.C. 154(b) by 0 days.

(21) Appl. No.: 17/229,780

(22) Filed: Apr. 13, 2021

(65) Prior Publication Data
US 2021/0316668 A1   Oct. 14, 2021

Related U.S. Application Data

(60) Provisional application No. 63/010,034, filed on Apr. 14, 2020.

(51) Int. Cl.
*B60R 9/06* (2006.01)
*B60P 1/43* (2006.01)

(52) U.S. Cl.
CPC .............. *B60R 9/06* (2013.01); *B60P 1/433* (2013.01)

(58) Field of Classification Search
CPC .................................. B60R 9/06; B60P 1/433
USPC ......................................................... 224/486
See application file for complete search history.

(56) References Cited

U.S. PATENT DOCUMENTS

| | | | |
|---|---|---|---|
| 4,874,284 A | 10/1989 | New, Jr. | |
| 5,096,362 A | 3/1992 | Best | |
| 5,368,209 A * | 11/1994 | Hill | B60R 9/065 280/30 |
| 5,649,732 A | 7/1997 | Jordan et al. | |
| 5,971,465 A | 10/1999 | Ives et al. | |
| 6,250,874 B1 | 6/2001 | Cross | |
| 6,379,101 B1 | 4/2002 | Breaux | |
| 6,533,337 B1 * | 3/2003 | Harshman | B60P 3/07 224/403 |
| 6,536,822 B1 | 3/2003 | Vagedes et al. | |
| 6,769,583 B1 * | 8/2004 | Gordon | B60R 9/06 224/924 |
| 6,948,732 B2 * | 9/2005 | Amacker | B60R 9/06 280/495 |
| 7,070,220 B1 * | 7/2006 | Lantaigne | B60R 9/06 296/26.11 |
| 7,090,104 B2 * | 8/2006 | Dorety | B60R 9/06 108/4 |
| 7,179,042 B1 | 2/2007 | Hartmann et al. | |
| 7,527,282 B2 * | 5/2009 | Gilbert | B60P 3/122 224/504 |
| 7,914,060 B2 * | 3/2011 | Scribner | B60P 3/40 224/524 |
| 8,087,559 B2 * | 1/2012 | Medina | B60R 3/02 224/502 |
| 8,123,455 B2 * | 2/2012 | Chamoun | B62D 63/061 296/61 |
| 8,292,565 B1 * | 10/2012 | Ruff | B60P 1/43 414/812 |

(Continued)

*Primary Examiner* — Peter N Helvey

(74) *Attorney, Agent, or Firm* — The Compton Law Firm, P.C.; Scott D. Compton

(57) ABSTRACT

The present disclosure is directed to an apparatus attachable to a vehicle having a flatbed support surface and a hitch receiver to assist with loading and unloading of wheeled items on and off the vehicle. The apparatus may be attached to a vehicle in a ramp configuration. The apparatus may also be attached to a vehicle in a non-ramp configuration such as a support surface configuration for carrying items thereon.

17 Claims, 21 Drawing Sheets

(56) References Cited

U.S. PATENT DOCUMENTS

| | | | | |
|---|---|---|---|---|
| 8,561,238 B1* | 10/2013 | Inget | | B60P 1/435 |
| | | | | 14/71.1 |
| 8,820,598 B2 | 9/2014 | Tennyson et al. | | |
| 8,894,345 B1* | 11/2014 | Richins | | B60P 3/122 |
| | | | | 414/537 |
| 9,085,258 B2* | 7/2015 | Patterson | | B60P 3/07 |
| 9,108,687 B2* | 8/2015 | Lepage | | B62D 33/033 |
| 9,670,013 B2* | 6/2017 | Parrish | | B60P 3/40 |
| 9,676,315 B1 | 6/2017 | Davis | | |
| 9,745,153 B2* | 8/2017 | Pelzer | | B60P 1/43 |
| 9,775,326 B1 | 10/2017 | MacNeil et al. | | |
| 10,377,291 B2 | 8/2019 | Keck | | |
| 10,464,464 B2* | 11/2019 | Pendleton | | B60P 1/43 |
| 2001/0030216 A1* | 10/2001 | Johnson | | B60R 9/06 |
| | | | | 224/521 |
| 2002/0154980 A1* | 10/2002 | Potts | | B60R 9/06 |
| | | | | 414/470 |
| 2003/0094472 A1* | 5/2003 | Knodle | | B60R 3/02 |
| | | | | 224/509 |
| 2004/0009055 A1 | 1/2004 | Scherle | | |
| 2004/0223836 A1 | 11/2004 | Robertson | | |
| 2004/0232185 A1* | 11/2004 | Darby | | B60R 9/06 |
| | | | | 224/521 |
| 2005/0135908 A1 | 6/2005 | Eidsmore | | |
| 2005/0263555 A1 | 12/2005 | Hail et al. | | |
| 2006/0133915 A1 | 6/2006 | Day | | |
| 2008/0292438 A1 | 11/2008 | Patterson | | |
| 2013/0045069 A1* | 2/2013 | Day | | B60P 1/43 |
| | | | | 414/812 |
| 2013/0175820 A1* | 7/2013 | Lepage | | B60R 5/041 |
| | | | | 296/26.08 |
| 2013/0343847 A1* | 12/2013 | Freeman | | B60P 1/435 |
| | | | | 414/812 |
| 2014/0338137 A1* | 11/2014 | Stokes | | B60P 1/43 |
| | | | | 14/71.1 |
| 2016/0144758 A1 | 5/2016 | Knapp | | |
| 2019/0135158 A1 | 5/2019 | Outoukian | | |
| 2020/0031267 A1 | 1/2020 | Pelzer | | |

* cited by examiner

HITCHABLE APPARATUS FOR USE WITH VEHICLES

CROSS-REFERENCE TO RELATED APPLICATIONS

This application claims benefit of U.S. Provisional Patent Application No. 63/010,034, filed on Apr. 14, 2020, the content of which is hereby incorporated by reference in its entirety.

STATEMENT REGARDING FEDERALLY SPONSORED RESEARCH OR DEVELOPMENT

Not applicable.

BACKGROUND OF THE DISCLOSURE

1. Field of the Invention

This disclosure relates generally to an apparatus connectable to a vehicular hitch receiver for use as a ramp and as a cargo carrier.

2. Background Art

Portable ramps for loading and unloading wheeled vehicles such as ATVs and motorcycles in and out of pickup truck beds are known. However, commercially available pickup truck ramps are typically configured for operation with one or more particular pickup trucks, e.g., according to the location of a hitch receiver of a pickup truck and/or according to the location of the outer edge of the tailgate of a pickup truck when the tailgate is lowered to a horizontal position and/or according to the location of a bumper of a pickup truck. As such, pickup truck ramps are not configured for use with other cargo vehicles such as cargo vans. For example, pickup truck ramps do not typically safely connect to cargo vans and/or do not provide a safe surface transition between a bed of a cargo van and a ramp surface when wheeling ATVs and motorcycles on and off of a cargo van. Pickup truck ramps also do not necessarily provide a safe ramp angle for loading and unloading ATVs and motorcycles on and off of cargo vans.

In addition, commercially available pickup truck ramps are limited in use as they are configured to connect to pickup trucks in a manner suitable for providing a ramp surface between a bed of a pickup truck and the ground.

Overcoming the above shortcomings is desired.

SUMMARY OF THE DISCLOSURE

The present disclosure is directed to an apparatus for use with a vehicle having a flatbed support surface and a hitch receiver, the apparatus comprising (1) a first support surface configured as a ramp surface for wheeled vehicles; (2) a second support surface configured as a cargo carrier surface; (3) a first mating member for mating the apparatus with the hitch receiver for use of the apparatus as a ramp for wheeled vehicles; and (4) a second mating member for mating the apparatus with the hitch receiver for use of the apparatus as a cargo carrier; wherein the second mating member comprises a third support surface operationally configured as a foot step when the first connector is mated with the hitch receiver.

The present disclosure is also directed to an apparatus for use with a vehicle having a flatbed support surface and a female hitch receiver, the apparatus comprising (1) a first ramp surface; (2) a second cargo surface; (3) a first mating member for securing the apparatus to the female hitch receiver; and (4) a second mating member for securing the apparatus to the female hitch receiver; wherein mating of the first mating member to the hitch receiver orients the apparatus for use as a ramp and wherein mating of the second mating member orients the apparatus for use as a cargo holder.

The present disclosure is also directed to a hitchable apparatus for use with a hitch receiver of a vehicle comprising (1) a main body including a first support surface operationally configured as a ramp surface for one or more wheeled vehicles; and a second support surface operationally configured as a cargo carrier surface; (2) a first mating member extending out from the main body in a first direction for releasably securing the apparatus to the hitch receiver; and (3) a second mating member extending out from the main body in a second direction for releasably securing the apparatus to the hitch receiver.

DEFINITIONS USED IN THE DISCLOSURE

Figure 1:
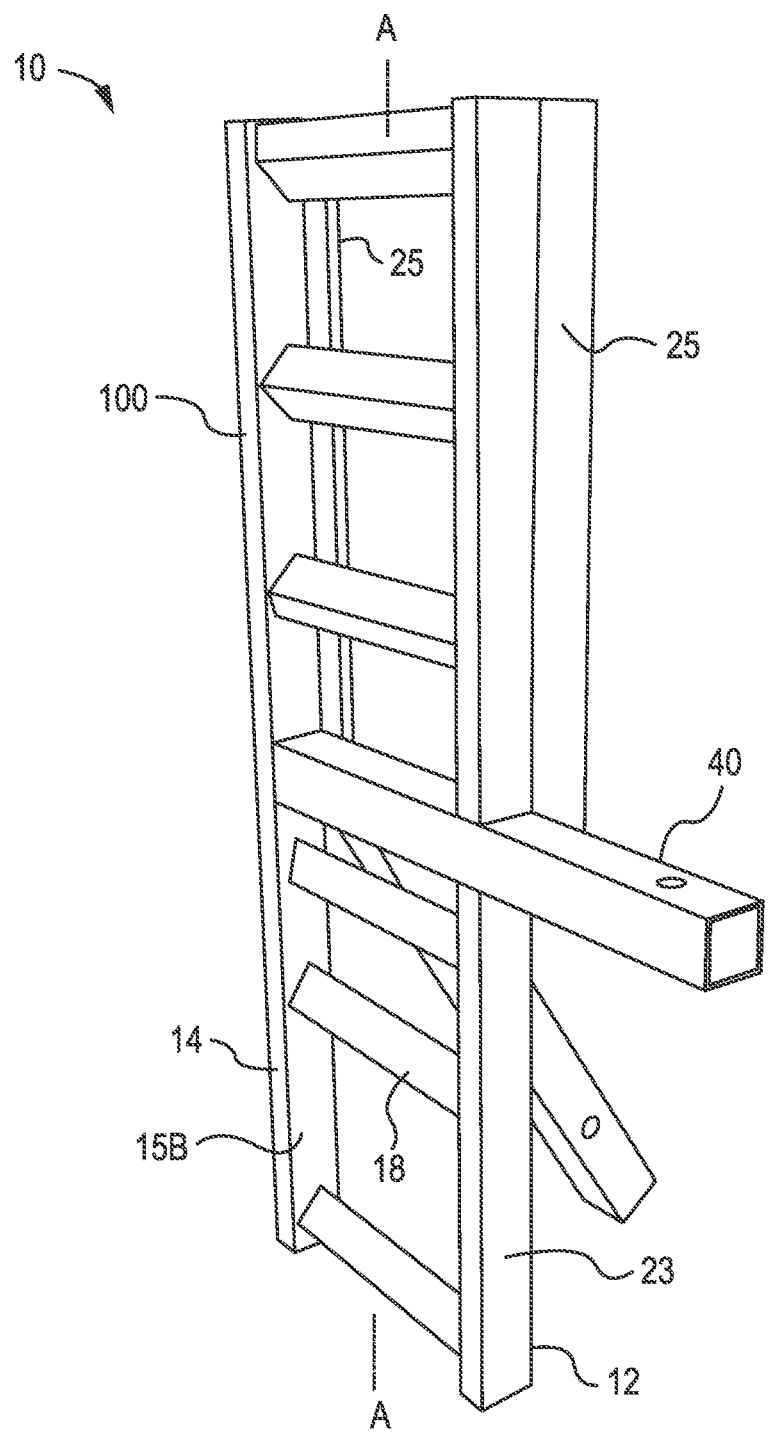
FIG. 1 is a perspective view of an apparatus of the present disclosure.

The term "at least one", "one or more", and "one or a plurality" mean one thing or more than one thing with no limit on the exact number; these three terms may be used interchangeably within this disclosure. For example, at least one device means one or more devices or one device and a plurality of devices.

The term "about" means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value.

The term "substantially" or "essentially" means that a value of a given quantity is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

DETAILED DESCRIPTION OF THE DISCLOSURE

For the purposes of promoting an understanding of the principles of the disclosure, reference is now made to the embodiments illustrated in the drawings and particular language will be used to describe the same. It is to be understood that the present disclosure is not limited to particular embodiments and that no limitation of the scope of the claimed subject matter is intended by way of the disclosure. As understood by one skilled in the art to which the present disclosure relates, various changes and modifications of the principles as described and illustrated are herein contemplated.

It is also to be understood that the terminology used herein is for the purpose of describing particular embodiments only, and is not intended to be limiting. As used in this specification and the appended claims, the term "ground" may refer to the natural earth and also man-made vehicular support surfaces. Examples of man-made vehicular surfaces include, but are not necessarily limited to interstate, highway, street and other road surfaces, parking lot surfaces, train and tractor trailer flatbed support surfaces, bridge surfaces, marine decks, construction platforms and construction floors, ship and boat decks, shipping container surfaces, airplane cargo surfaces, and other man-made surfaces operable for supporting vehicles thereon. In reference to an apparatus of the present disclosure being operationally configured to carry one or more items, the term "carry" means the ability of the apparatus to hold for transport one or more items thereon. One or more items to be carried by the apparatus may be referred to herein as "cargo" and/or as a "load" and/or as "baggage." Herein, a "cargo vehicle" may include but is not necessarily limited to one or more trucks, one or more cargo vans, one or more passenger vans, one or more box trucks, one or more flatbed trucks, and combinations thereof comprising a flatbed support surface. One non-limiting example of a truck includes a F-150® truck commercially available from Ford Motor Company Corporation, headquartered in Dearborn, Mich., U.S.A. One non-limiting example of a cargo van includes a Transit® cargo van commercially available from Ford Motor Company Corporation, headquartered in Dearborn, Mich., U.S.A. One non-limiting example of a passenger van includes a Transit® passenger van commercially available from Ford Motor Company Corporation, headquartered in Dearborn, Mich., U.S.A. One non-limiting box truck is commercially available from Isuzu Motors, Ltd., headquartered in Tokyo, Japan. One non-limiting flatbed truck is commercially available from Isuzu Motors, Ltd., headquartered in Tokyo, Japan.

In one embodiment, the disclosure is directed to a portable apparatus operationally configured as a hitch mount ramp apparatus for use with one or more vehicles having a hitch receiver. In one embodiment, the disclosure is directed to a portable apparatus operationally configured as a hitch mount ramp apparatus for use with one or more vehicles having a hitch receiver and a flatbed support surface. In one embodiment, the disclosure is directed to a portable apparatus operationally configured as a hitch mount ramp apparatus for use with one or more vehicles having a female hitch receiver. In one embodiment, the disclosure is directed to a portable apparatus operationally configured as a hitch mount ramp apparatus for use with one or more vehicles having a female hitch receiver and a flatbed support surface. In one embodiment, the disclosure is directed to a portable apparatus operationally configured as a hitch mount cargo carrier apparatus for use with one or more vehicles having a hitch receiver. In one embodiment, the disclosure is directed to a portable apparatus operationally configured as a hitch mount cargo carrier apparatus for use with one or more vehicles having a female hitch receiver. In one embodiment, the disclosure is directed to a portable apparatus operationally configured as a hitch mount cargo carrier apparatus for use with one or more vehicles having a hitch receiver and a flatbed support surface.

In one embodiment, the disclosure is directed to an apparatus comprising two or more male type mating members for mating with a female hitch receiver of a vehicle. The apparatus is operationally configured for a plurality of uses including, but not necessarily limited to use as a hitch mount ramp for wheeling items on and off a vehicle and use as a hitch mount cargo carrier.

In another embodiment, the disclosure is directed to a system and method for loading and unloading one or more wheeled vehicles to and from a flatbed support surface of a vehicle and/or for carrying one or more items at or near a rear portion of a vehicle adjacent a hitch receiver of the vehicle.

In another embodiment, the disclosure is directed to a multi-purpose apparatus for use with one or more cargo vehicles. In one embodiment, the apparatus is operationally configured for use as (1) a hitch mount ramp for wheeling one or more items on and off a support surface of a vehicle and as (2) a hitch mount cargo carrier. In one embodiment, the apparatus may be stored on a flatbed support surface of one or more cargo vehicles.

In another embodiment, the disclosure is directed to a multi-purpose apparatus for installation on a hitch receiver of a vehicle, the apparatus comprising (1) a first ramp surface; (2) a second cargo surface; (3) a first mating member for securing the apparatus to the hitch receiver; (4) a second mating member for securing the apparatus to the hitch receiver; wherein mating of the first mating member with the hitch receiver orients the apparatus for use as a ramp and wherein mating of the second mating member with the hitch receiver orients the apparatus for use as a hitch mount cargo carrier.

In another embodiment, the disclosure is directed to an apparatus operationally configured for use with a hitch receiver of a vehicle, the apparatus comprising (1) an elongated main frame including a first surface operationally configured as a ramp surface and a second surface operationally configured as a cargo support surface; (2) a first mating member extending out from the main frame in a first direction; and (3) a second mating member extending out from the main frame in a second direction; wherein the first mating member and the second mating member are operationally configured to mate with the hitch receiver of the vehicle.

In another embodiment, the disclosure is directed to an apparatus for use with a vehicle having a cargo bed and a hitch receiver, the apparatus comprising (1) a first support surface operationally configured as a ramp surface for wheeled vehicles; (2) a second support surface operationally configured as a cargo carrier surface; (3) a first connector for mating the apparatus with a hitch receiver for use of the apparatus as a ramp; and (4) a second connector for mating the apparatus with the hitch receiver for use of the apparatus as a cargo carrier; wherein the second connector comprises a third support surface operationally configured as a foot step when the first connector is mated with the hitch receiver.

Figure 2:
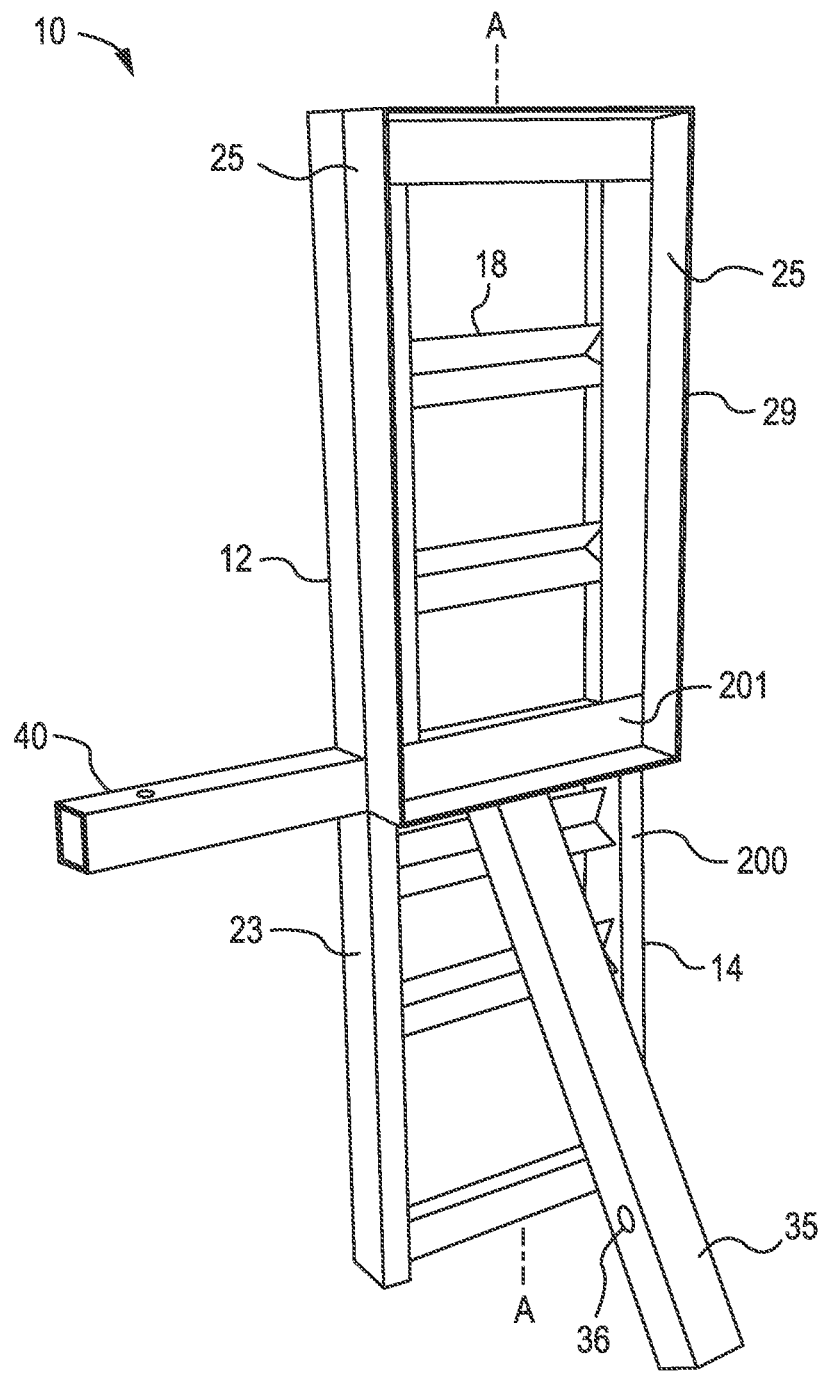
FIG. 2 is another perspective view of the apparatus of FIG. 1.

A first embodiment of an apparatus 10 of this disclosure is provided in FIGS. 1 and 2. In this embodiment, the apparatus 10 includes an elongated main body comprising a first side defining a first support surface operationally configured as a ramp surface of the apparatus 10 for wheeled vehicles (hereafter referred to as a "first surface 100" or "ramp surface 100"). As such, an apparatus 10 of this disclosure is operationally configured as a ramp for one or more wheeled vehicles. The main body also comprises an opposing second side defining a second support surface operationally configured as a cargo carrying surface of the apparatus 10 (hereafter referred to as a "second surface 200" or "cargo surface 200"). As such, an apparatus 10 of this disclosure is also operationally configured as a cargo carrier.

In the embodiment of FIGS. 1 and 2, the main body of the apparatus 10 comprises opposing elongated parallel side rails including a first side rail 12 and a second side rail 14 with one or more elongated rungs 18 disposed perpendicular to and interconnecting the first and second side rails 12 and 14. In this embodiment, the first and second side rails 12, 14 define the length of the main body of the apparatus 10. In this embodiment, the first side rail 12 comprises a two-part first side rail (see upper part 12A and lower part 12B in FIG. 17) and a second side rail is provided as a single continuous second side rail 14. As shown, the configuration of the main body of the apparatus 10 may be described as being like or similar to a ladder configuration.

With further reference to FIGS. 1 and 2, the size of the apparatus 10 may vary as desired for operation with one or more vehicles, e.g., one or more vehicles comprising a flatbed support surface at one or more particular altitudes from the ground and/or one or more vehicles comprising one or more hitch receivers at one or more altitudes from the ground. Likewise, the length and/or width of the side rails 12, 14 and/or the length and/or width of the one or more rungs 18 may vary in a manner effective to provide a first surface 100 operable with a wheeled vehicle of a particular size and/or operable with tires of a particular size to be rolled across the first surface 100. Although an apparatus 10 of this disclosure may be built to scale, in an embodiment of an apparatus 10 operationally configured for use with a cargo van 300 for the loading and unloading of a motorcycle 280 as discussed herein, the length of each of the side rails 12, 14 may range from or about 76.2 cm to or about 127.0 cm (from or about 30.0 inches to or about 50.0 inches) and the width of each of the side rails 12, 14 may range from or about 0.64 cm to or about 10.2 cm (from or about 0.25 inches to or about 4.0 inches) wherein the length of the side rails 12, 14 defines the length of the main body of the apparatus 10 and the width of the main body of the apparatus 10 is defined by the opposing outer surfaces of the side rails 12, 14.

With reference to FIG. 2, at least part of the second surface 200 may include a raised perimeter comprised of one or more raised sidewalls 25 and/or other raised members defining a perimeter of a cargo carrying surface 201 of the second surface 200. As shown in FIG. 2, in one embodiment the raised frame member may comprise a single continuous raised sidewall 25 that is uniform or substantially uniform in height. In other words, the raised sidewall 25 of FIG. 2 comprises an outer edge 29 equidistant or substantially equidistant from the second surface 200 at all points along the outer edge 29. Suitably, the one or more raised sidewalls 25 extend out from the second surface 200 a distance effective to hold one or more cargo items therein in a manner effective to prevent lateral movement and/or tipping over of one or more cargo items during operation of the apparatus 10. As such, the raised sidewall 25 may be operationally configured to accommodate one or more target cargo items of one or more known heights and/or lengths and/or widths and/or shapes and/or weights and/or weight distributions, e.g., a cargo item that is top heavy and prone to tipping over under force.

Figure 3:
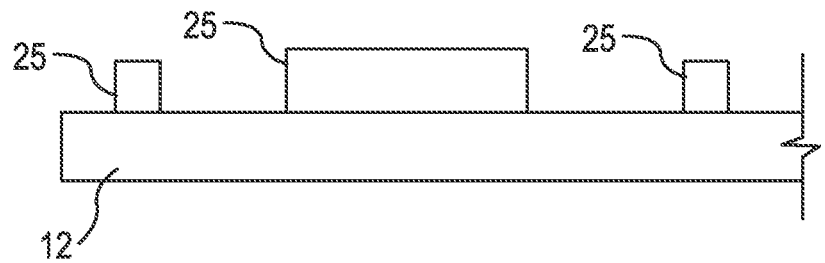
FIG. 3 is a partial side view of an apparatus of the present disclosure including an embodiment of a raised frame member of a second surface of the apparatus.
Figure 4:
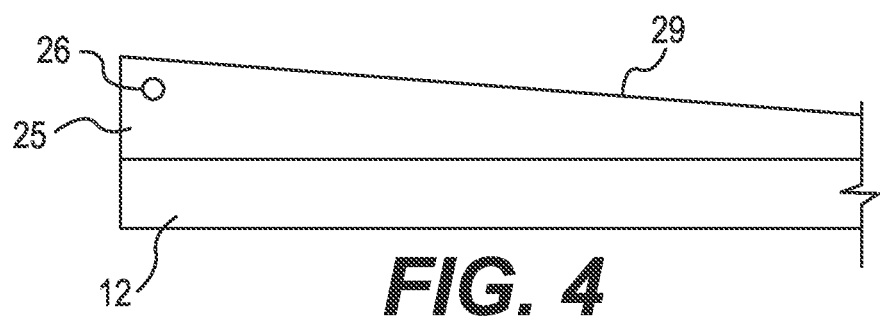
FIG. 4 is a partial side view of an apparatus of the present disclosure including an embodiment of a raised frame member of a second surface of the apparatus.

As shown in FIG. 3, in one embodiment a raised frame member may comprise a plurality of raised sidewalls 25 of varying size spaced apart one or more distances as desired or as otherwise required for holding one or more cargo items. Referring to FIG. 4, in another embodiment a raised frame member may comprise one or more raised sidewalls 25 having a sloped outer edge 29 as shown or a curved outer edge 29. In addition, one or more sidewalls 25 of a raised frame member may include one or more apertures 26 and/or hooks attached to the one or more sidewalls 25 operationally configured to receive tie down material for securing one or more cargo items within a cargo carrying surface 201. Non-limiting examples of tie down material include, rope, cord, strap material, elastic cord, chain, netting, and combinations. In FIG. 4, the aperture 26 comprises a circular configuration for receiving tie down materials and/or hooks of tie down material there through. In another embodiment, one or more raised sidewalls 25 may comprise one or more rectangular slot type apertures 26 operationally configured to receive strap material there through, e.g., straps having hook and loop type fasteners, ratchet straps, straps having buckle fasteners. Other aperture 26 configurations and/or tie down material connectors, e.g., snaps, magnets, buckles, are herein contemplated as desired or as may be otherwise required for optimum use with one or more particular tie down materials.

Figure 5:
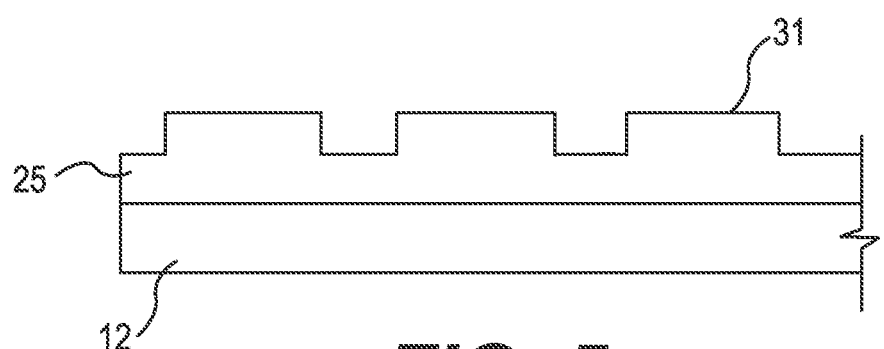
FIG. 5 is a partial side view of an apparatus of the present disclosure including an embodiment of a raised frame member of a second surface of the apparatus.
Figure 6:
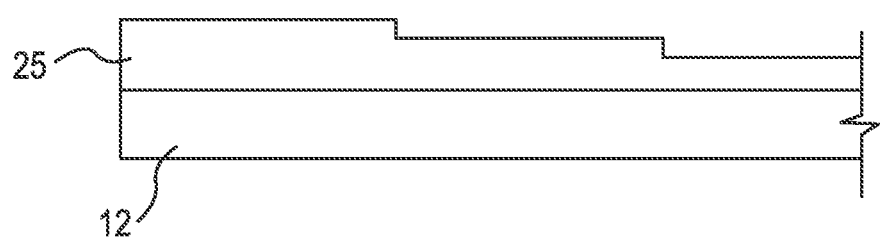
FIG. 6 is a partial side view of an apparatus of the present disclosure including an embodiment of a raised frame member of a second surface of the apparatus.

Turning to FIG. 5, in another embodiment a raised frame member may comprise one or more raised sidewalls 25 having one or more raised sections 31. In another embodiment, a raised frame member may comprise one or more raised sidewalls 25 having a stepped outer edge 29 configuration as shown in FIG. 6. Also, the one or more raised sidewalls 25 may vary in thickness as desired, e.g., according to one or more anticipated uses of a cargo carrying surface 201 and/or according to the material(s) of construction of the one or more raised sidewalls 25.

Figure 7:
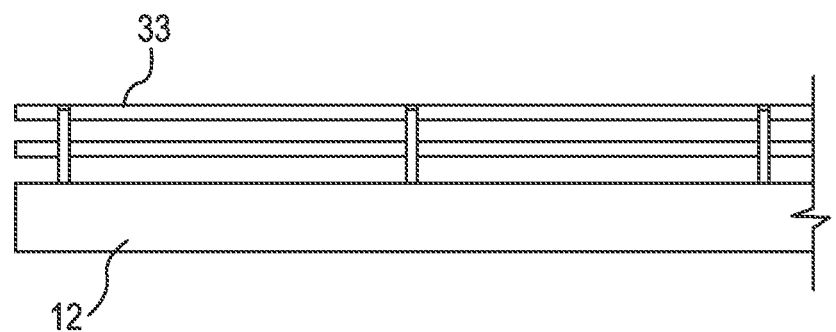
FIG. 7 is a partial side view of an apparatus of the present disclosure including an embodiment of a raised frame member of a second surface of the apparatus.
Figure 8:
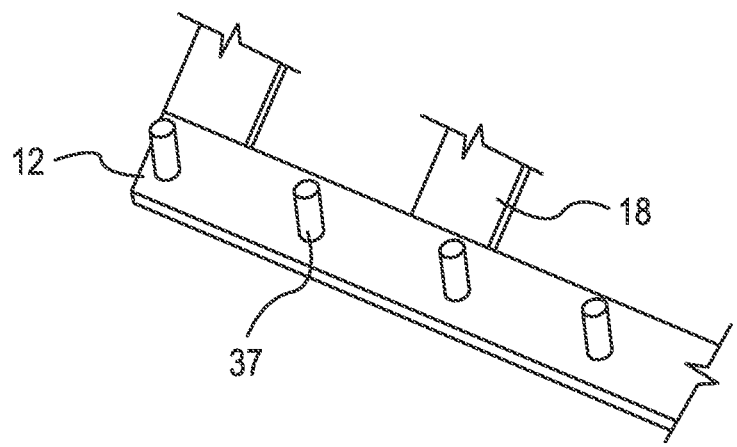
FIG. 8 is a partial perspective view of an apparatus of the present disclosure including an embodiment of a raised frame member of a second surface of the apparatus.
Figure 9:
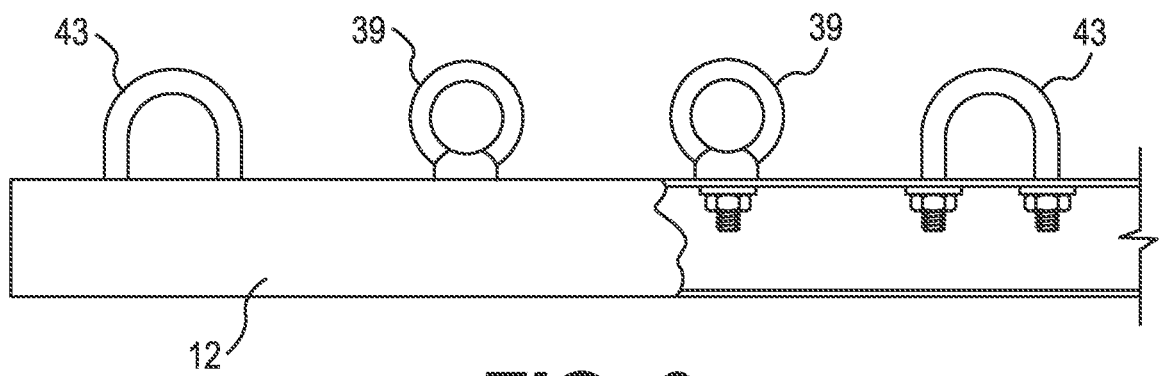
FIG. 9 is a partial side view of an apparatus of the present disclosure including an embodiment of a raised frame member of a second surface of the apparatus.

In another embodiment, a raised frame member may comprise a railing type configuration 33 (see FIG. 7). As shown in FIG. 8, a raised frame member may comprise a plurality of elongated pegs or post type members 37 defining a perimeter of a cargo carrying surface 201 e.g., a plurality of raised cylindrical pegs and/or raised non-cylindrical pegs. In one embodiment, elongated post type members 37 may be permanently fixed to the main body of the apparatus 10. In another embodiment, the main body of the apparatus 10 may include threaded apertures for receiving threaded male surfaces of the elongated post type members 37. As shown in FIG. 9, in still another embodiment the main body of the apparatus 10 may comprise one or more threaded apertures for receiving one or more threaded eye bolts 39 and/or threaded U-bolts 43 operationally configured as a raised frame member of the apparatus 10 and also operationally configured to provide attachment surfaces for tie down material. As further shown in FIG. 9, one or more eye bolts 39 and/or U-bolts 43 may be permanently fixed to a main body of the apparatus 10, e.g., via welds.

Figure 10:
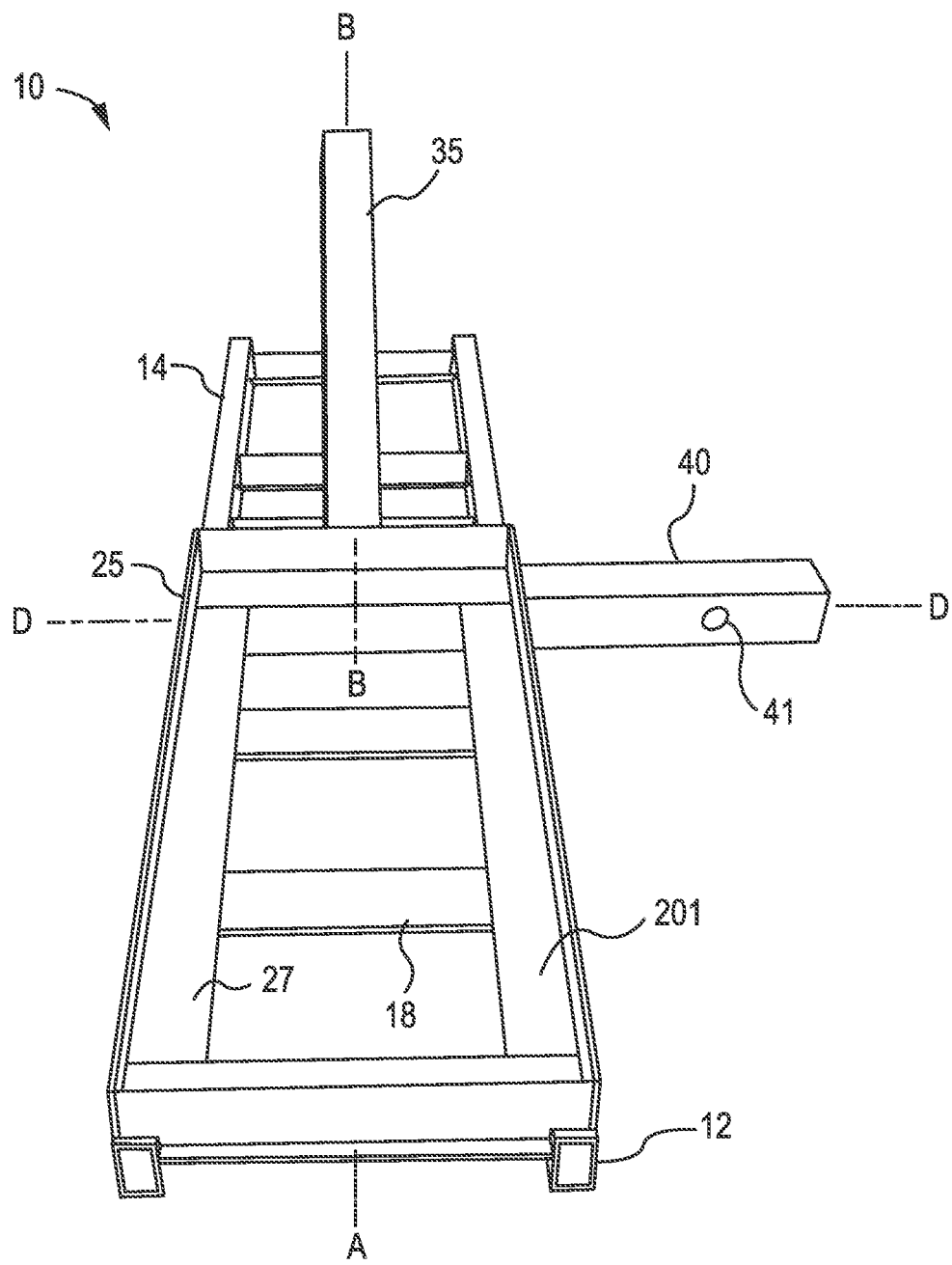
FIG. 10 is another perspective view of the apparatus of FIG. 1.
Figure 11:
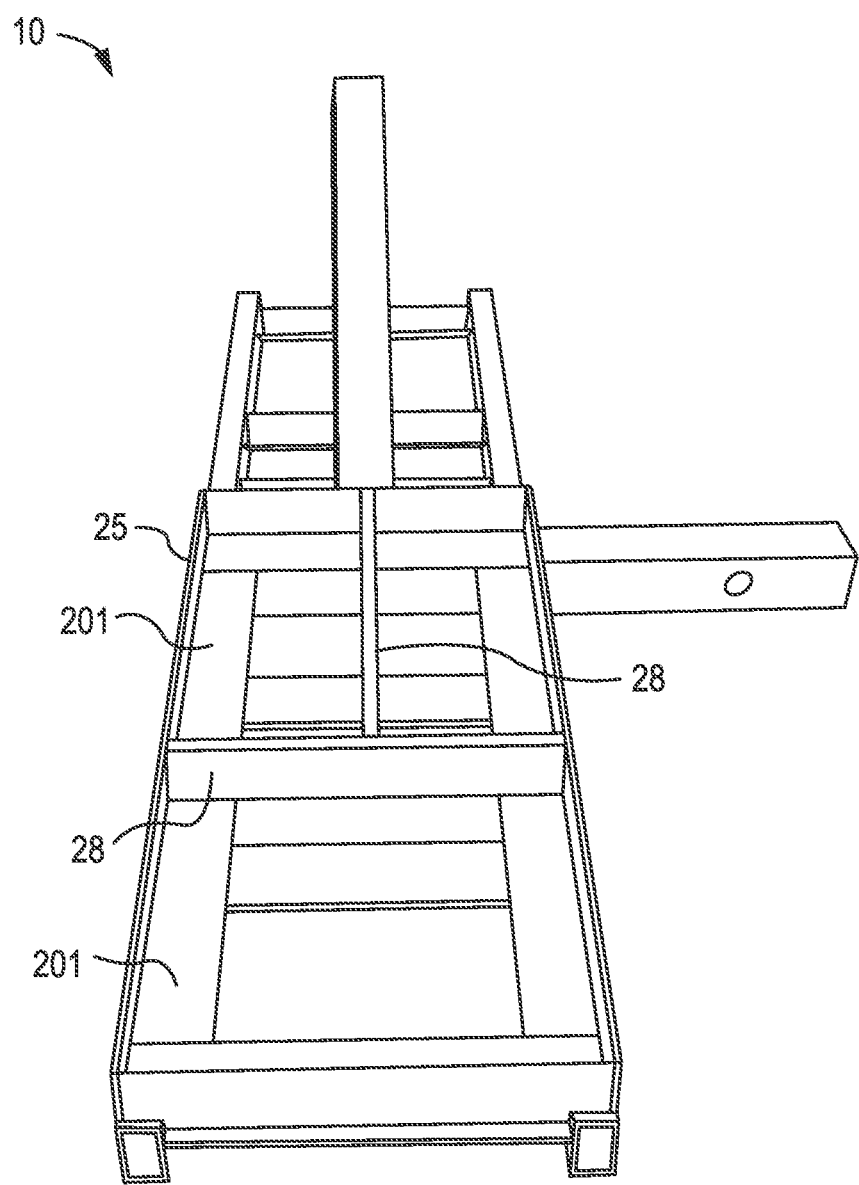
FIG. 11 is a perspective view of an embodiment of an apparatus of the present disclosure.

Referring to FIG. 10, a cargo carrying surface 201 of the second surface 200 of the apparatus 10 may include (1) one or more a perimeter support surfaces 27 and (2) part of one or more rungs 18 as shown. In one embodiment, the one or more raised sidewalls 25 and one or more perimeter support surfaces 27 may comprise one or more two-sided angled members, e.g., elongated L-angle beams, operationally configured to form the one or more raised sidewalls 25 and one or more perimeter support surfaces 27 of a cargo carrying surface 201 as shown. In another embodiment as shown in FIG. 11, one or more additional divider type wall members 28 may be disposed across the cargo carrying surface 201 to provide two or more individual or separate cargo carrying surfaces operationally configured to carry different size and/or different type items therein.

Figure 12:
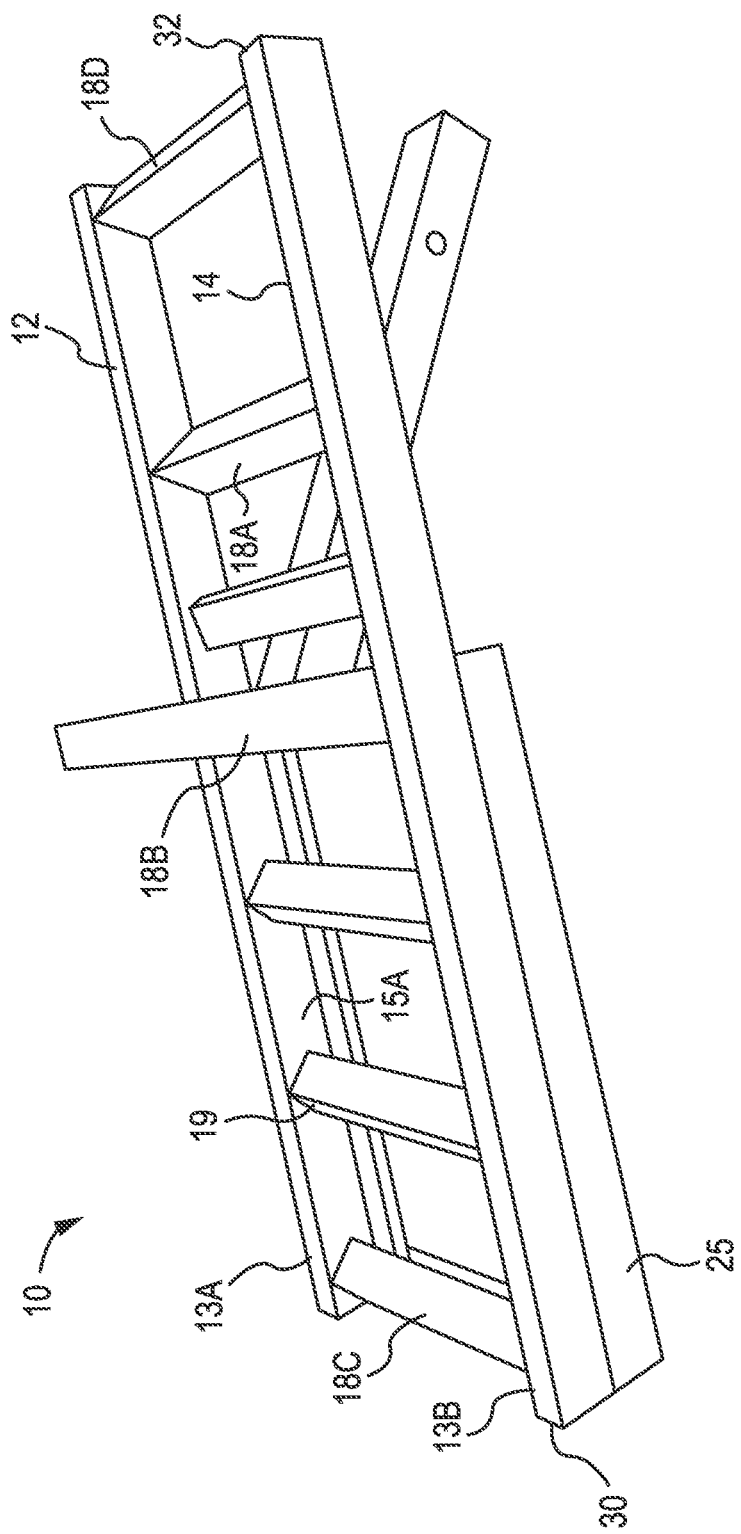
FIG. 12 is another perspective view of the apparatus of FIG. 1.

As shown in FIG. 1, in one embodiment the first side rail 12 and the second side rail 14 of the apparatus 10 may comprise elongated rectangular tubing of equal or substantially equal dimensions that are spaced apart according to the length of the one or more rungs 18 disposed there between wherein the opposing ends of the one or more rungs 18 are attached to the inner surfaces 15A, 15B of the first and second side rails 12 and 14 (see also FIG. 12). As further shown in FIG. 1, the center point of each of the one or more rungs 18 defines a longitudinal center line A-A of the main body of the apparatus 10. In another embodiment, one or both ends of one or more rungs 18 may extend beyond the inner surfaces 15A and/or 15B and attach to surfaces of the first and second side rails 12 and 14 other than the inner surfaces 15A and/or 15B. In another embodiment, the inner surfaces 15A, 15B of the first and second side rails 12 and 14 may include apertures for receiving the opposing ends of the one or more rungs 18 therein and/or there through. In such embodiments, the longitudinal center line A-A of the main body of the apparatus 10 is the midpoint between the first and second side rails 12 and 14.

In another embodiment, the first and second side rails 12 and 14 may comprise elongated rectangular solid members or elongated rectangular members that are part solid and part hollow. In another embodiment, the first and second side rails 12 and 14 may comprise a different configuration including, but not necessarily limited to elongated triangular tubing, elongated triangular solid members, elongated U-beams, elongated curved beams, elongated cylindrical tubing, elongated cylindrical solid members, elongated oval-shaped tubing, elongated oval-shaped solid members, elongated I-beams, elongated L-angle beams, elongated T-bar beams, elongated wide flange beams, elongated channel beams, elongated irregular shaped beams, and combinations thereof. In another embodiment, an apparatus 10 may comprise a first side rail 12 of a first configuration and a second side rail 14 of a second configuration different from the first configuration. In another embodiment, an apparatus 10 may comprise a first side rail including an upper part 12A of a first configuration and a lower part 12B of a second configuration, and a second side rail 14 of a third configuration.

In one embodiment, the one or more rungs 18 may be provided as like members of equal or substantially equal dimensions (see the elongated L-angle rungs 18 in FIG. 1). In another embodiment, at least one rung 18 may comprise a configuration different from one or more other rungs 18 of the apparatus 10 (see FIG. 18). Suitable rung 18 configurations include, but are not necessarily limited to elongated L-angle beams, elongated triangular tubing, elongated triangular solid members, elongated U-beams, elongated curved beams, elongated cylindrical tubing, elongated cylindrical solid members, elongated oval-shaped tubing, elongated oval-shaped solid members, elongated I-beams, elongated T-bar beams, elongated wide flange beams, elongated channel beams, elongated irregular shaped beams, and combinations thereof.

In another embodiment, the first side rail 12 and/or the second side rail 14 and/or the one or more rungs 18 may comprise an assembly of two or more individual members connected in a manner effective to provide an apparatus 10 of a desired length and/or width. In addition, the number of rungs 18 included and/or the spacing between adjacent rungs 18 may vary as desired or as may otherwise be required for operation of the apparatus 10, however, the total number of rungs 18 and the spacing between adjacent rungs 18 is suitable for use of the apparatus 10 as a ramp as described below.

Figure 13:
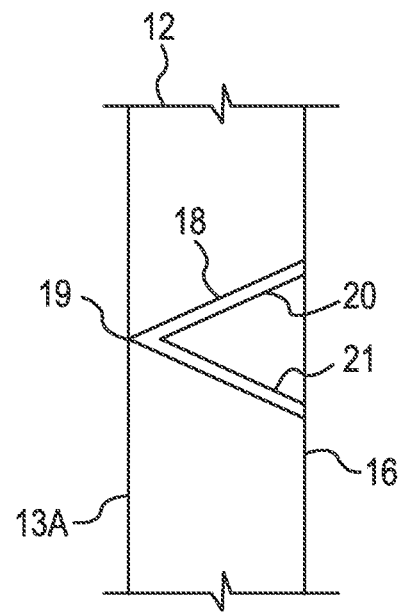
FIG. 13 is a sectional view of an embodiment of a rung and side rail of an apparatus of the present disclosure.
Figure 14:
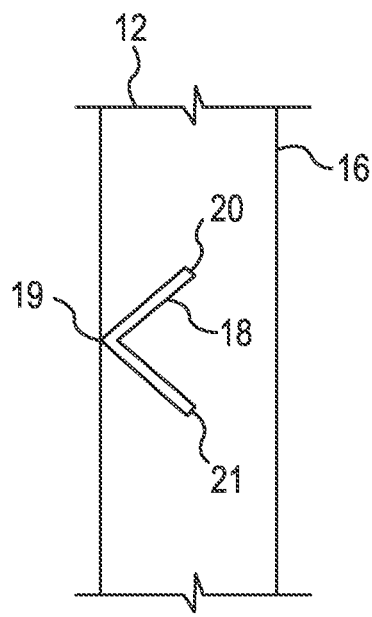
FIG. 14 is a sectional view of an embodiment of a rung and side rail of an apparatus of the present disclosure.

Turning to FIG. 13, in one embodiment one or more rungs 18 may include a height equal to or about equal to the width of the first and second side rails 12 and 14. In other words, a first end of a rung 18 (see apex 19), may terminate at or near a first facing surface of the first and second side rails 12 and 14 (see first facing surface 13A) and a second end shown here as legs 20 and 21 of the rung 18 may terminate at or near a second facing surface of the first and second side rails (see second facing surface 16). As shown in FIG. 14, in another embodiment one or more rungs 18 may include a height less than the width of the first and second side rails 12 and 14. In yet another embodiment, the first end of the one or more rungs 18 may terminate apart from the first facing surfaces of the first and second side rails 12 and 14. Regardless the location of the first end of the one or more rungs 18, the first end of the one or more rungs 18 are suitably located between the first and second side rails 12 and 14 at a location effective to provide a ramp surface.

Figure 15:
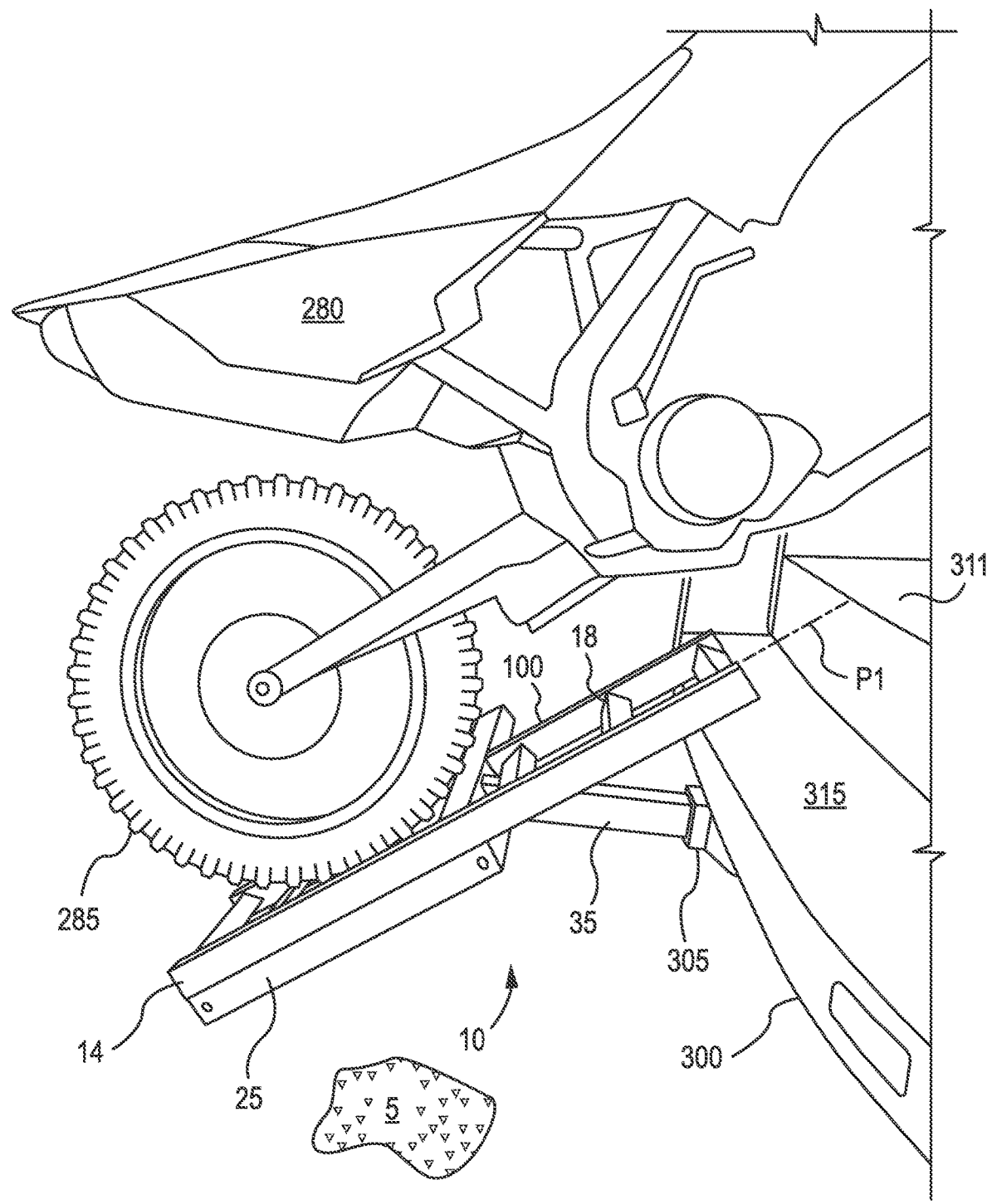
FIG. 15 is a perspective view of the apparatus of FIG. 1 in use as a hitch mount ramp for a cargo van.

As shown in FIG. 12, a first end of the one or more rungs 18 may terminate at or near the first facing surfaces (13A, 13B) between the first and second side rails 12 and 14 in a manner effective to provide a ramp type support surface or "ramp surface" along the main body of the apparatus 10. Without limiting the disclosure, the first surface 100 of the apparatus 10 will be described in terms of a ramp operationally configured for loading and unloading of a two-wheeled motorcycle 280 to and from a cargo van 300. As such, the end rungs (see 18C and 18D) are suitably located at or near the ends of the first and second side rails 12 and 14 (see first end 30 and second end 32) for lengthening the operable ramp surface of the first surface 100. With reference to FIG. 15, the spacing between adjacent rungs 18 is suitably less than the outer diameter of the tires 285 of a motorcycle 280 traveling across the rungs 18 effective to prevent the tires from dropping between adjacent rungs 18 at a depth that may hinder or otherwise prevent the tires 285 from freely turning during loading and unloading of a motorcycle 280 across the first surface 100 of the apparatus 10. In another embodiment, the spacing between adjacent rungs 18 may be less than or equal to the radius of the tires of a motorcycle traveling across the rungs 18 as shown in FIG. 15. In operation, the configuration of the first surface 100 and the size of the tires 285 of a motorcycle 280 traveling across the rungs 18 operate collectively similar as a motorcycle being wheeled across a solid planar surface. As understood by the skilled artisan, the size of the rungs 18 and/or the total number of rungs 18 and/or the distance between adjacent rungs 18 may be configured for use with one or more particular vehicles with tires and/or wheels of a particular radius. In addition, although the location of the apex 19 of the rungs 18 may vary from the location as shown in FIGS. 13 and 14, the location of the apex 19 of the rungs 18 as shown in FIGS. 13 and 14 suitably provides traction points of each of the rungs 18 for the outer surface of the tires 285 of a motorcycle 280 to engage when traveling across the apparatus 10.

Referring again to FIG. 2, the apparatus 10 further includes an elongated first mating member 35 extending out from the second surface 200 at or near the longitudinal center line A-A of the main body of the apparatus 10 in a first direction relative the main body of the apparatus 10, the first mating member 35 being operationally configured to mate or otherwise fasten to a female hitch receiver of a vehicle. The apparatus 10 also includes an elongated second mating member 40 operationally configured to mate with a rectangular female hitch receiver 305, the second mating member 40 extending out from the main body of the apparatus 10 in a second direction as shown. In this embodiment, the first mating member 35 includes an elongated rectangular configuration, i.e., an elongated square configuration, operationally configured to mate with a rectangular female hitch receiver (or "female hitch socket") of a vehicle and an aperture 36 for receiving a locking pin or the like there through for securing the first mating member 35 to a female hitch receiver as understood by persons of ordinary skill in the art of vehicular hitch receivers. As described herein, the first mating member 35 is operationally configured to mate with a female hitch receiver in a manner effective to orient and utilize the first surface 100 as a ramp surface in relation to a corresponding vehicle. Said another way, when the first mating member 35 is set to a mated position with a female hitch receiver 305 of a vehicle such as a cargo van 300, the apparatus 10 is set to a ramp position as shown in FIG. 15. In another embodiment, the apparatus 10 may comprise a first mating member 35 including a female mating surface for mating with a male type hitch receiver of a vehicle.

Figure 16:
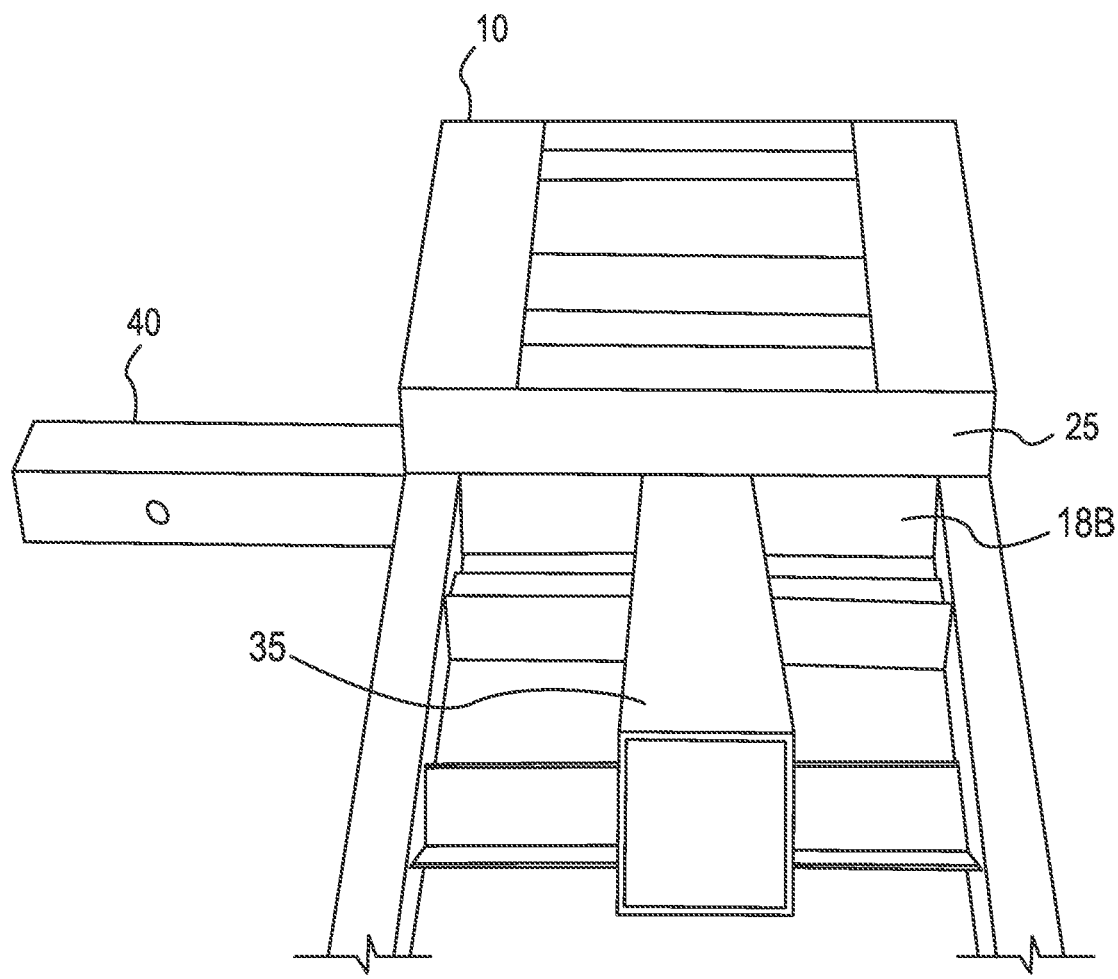
FIG. 16 is a partial perspective view of the apparatus of FIG. 1.

With reference to FIG. 16, in one embodiment part of a proximal end of the first mating member 35 may be attached or permanently fixed to part of the raised sidewall 25 and part of a proximal end of the first mating member 35 may be attached or permanently fixed to a rung section 18B of the second mating member 40 providing structural strength to the apparatus 10 during operation. In this embodiment, the raised sidewall 25 and the rung section 18B of the second mating member 40 collectively provide a planar or substantially planar contact surface for abutment of an angled proximal end of the first mating member 35 maximizing the contact surface area for attachment of the angled proximal end of a first mating member 35. In an embodiment of the apparatus 10 constructed from one or more metals, the proximal end of the first mating member 35 may be permanently fixed to the raised sidewall 25 and the rung section 18B via welds. In another embodiment, the first mating member 35 may be secured solely to either a rung section 18B of the second mating member 40 or the raised sidewall 25. In another embodiment, the apparatus 10 may include a female mating surface or a male mating surface extending out from the raised sidewall 25 and/or the rung section 18B of the second mating member 40 for mating with a hollow first mating member 35.

Figure 17:
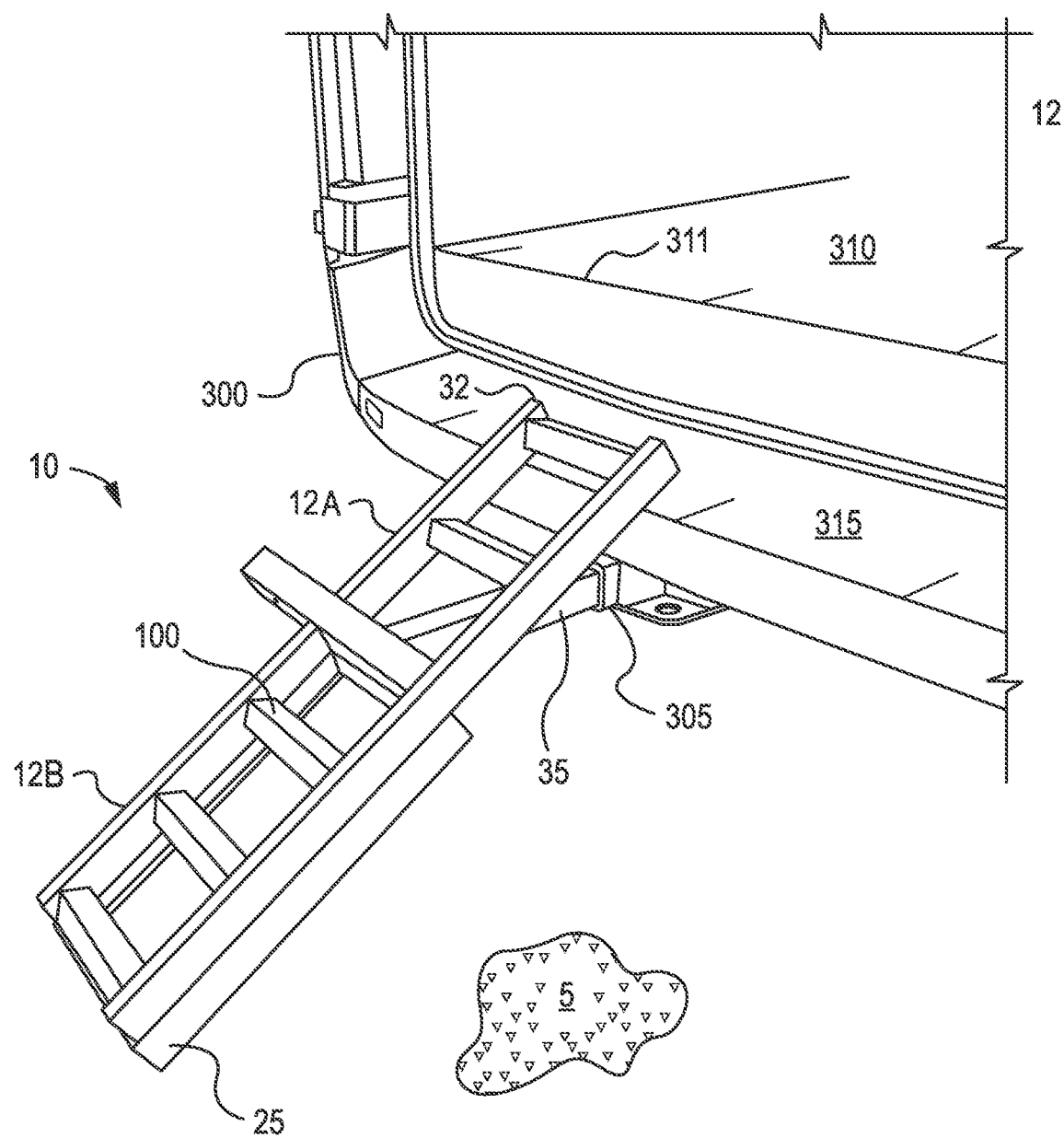
FIG. 17 is a perspective view of the apparatus of FIG. 1 mated to a cargo van.
Figure 18:
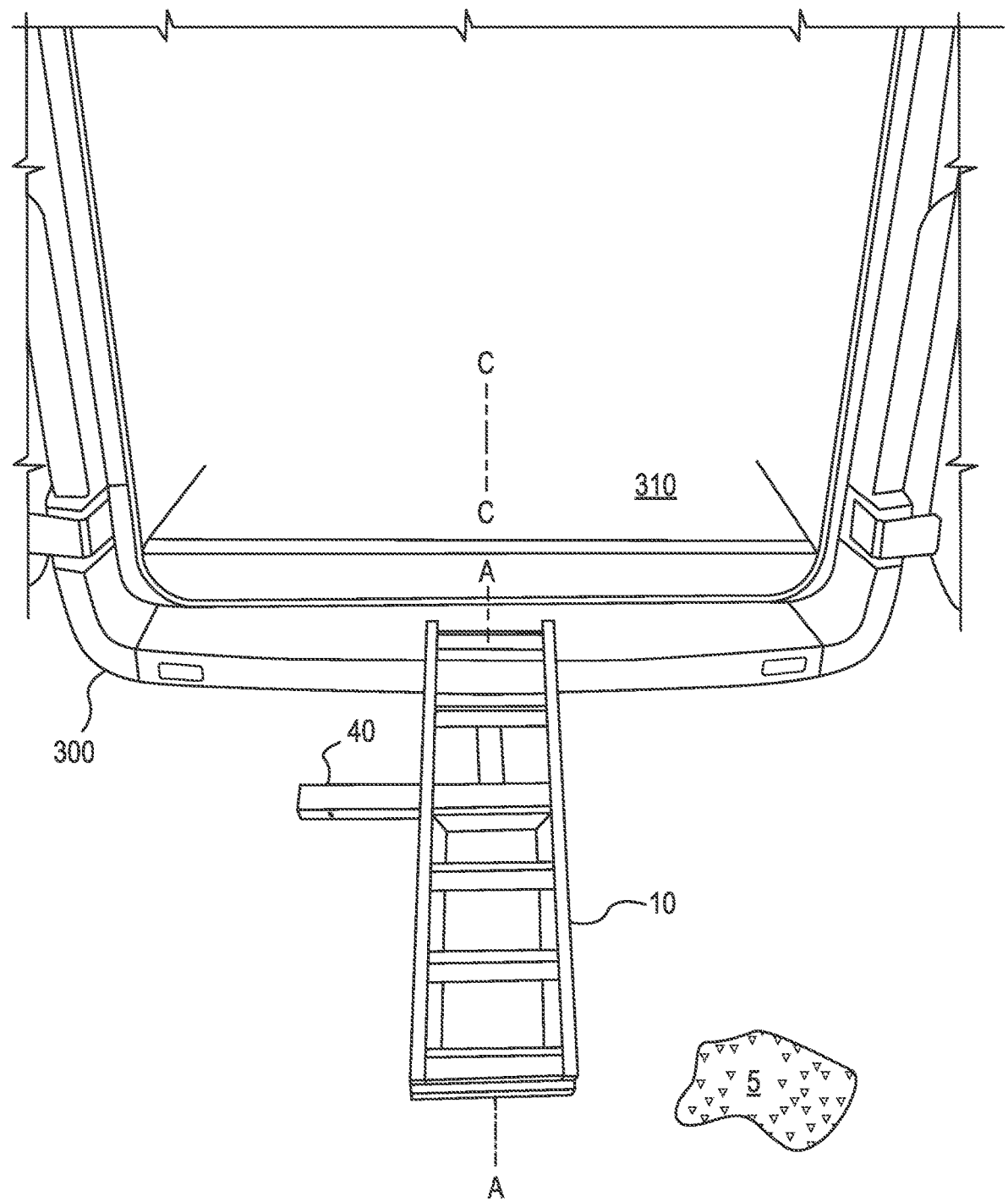
FIG. 18 is a perspective view of an embodiment of an apparatus of the present disclosure mated to a cargo van.

As stated above, the first mating member 35 suitably extends out from the second surface 200 at or near the longitudinal center line A-A of the main body of the apparatus 10 to provide an operable ramp position of the apparatus 10 when attached to a corresponding cargo van 300 (see FIGS. 15, 17 and 18). Suitably, the first mating member 35 extends out from the second surface 200 of the apparatus 10 wherein the longitudinal center line B-B of the first mating member 35 (see FIG. 10) is oriented in-line with the longitudinal center line A-A of the main body of the apparatus 10. As shown in FIG. 18, when an apparatus 10 of this disclosure is mated with a female hitch receiver 305 of a cargo van 300 the main body of the apparatus 10 is leaned toward a bed 310 of a cargo van 300 with the longitudinal center line A-A oriented in-line with a longitudinal center line C-C of the cargo van 300.

Referring again to FIG. 17, the length of the first mating member 35 and its position along the second surface 200 is effective to provide a desired ramp angle and orient the second end 32 of the main body of the apparatus 10 at or near a bed 310 of a cargo van 300—shown here as extending over at least part of a bumper 315 of a cargo van 300 at an altitude lower than the altitude of the bed 310 of the cargo van 300. As understood by the skilled artisan, the second end 32 of the main body of the apparatus 10 may terminate at a different altitude than as shown in FIG. 17.

As shown in FIG. 15, the first surface 100 of the apparatus 10 may be provided as a planar surface or a substantially planar surface (see plane P1) wherein the plane P1 of the first surface 100 is aligned with or substantially aligned with a near edge 311 of the bed 310 of the cargo van 300. Without limiting an apparatus 10 of this disclosure to a particular configuration, for use of an apparatus 10 with one or more commercially available cargo vans, the distance between a near edge 311 of a bed 310 of a cargo van 300 and the nearest rung 18 of the apparatus 10 when mated with female hitch receiver 305 may vary as desired, for example, from or about 10.2 cm (4.0 inches) to or about 25.4 cm (10.0 inches).

As further shown in FIG. 15, the first mating member 35 is the only part of the apparatus 10 in contact with the cargo van 300 via mating with the female hitch receiver 305 and only part of the raised sidewall 25 of the apparatus 10 is in contact with the ground 5. As such, the part of the raised sidewall 25 operationally configured to contact the ground 5 during operation of the apparatus 10 may be constructed from one or more materials operationally configured to (1) maintain the shape of the raised sidewall 25 under load and (2) protect against wearing of the raised sidewall 25 from frictional forces. In another embodiment, the part of the raised sidewall 25 operationally configured to contact the ground 5 and/or one or more other parts of the apparatus 10 may comprise one or more protective guards such as one or more liners and/or pads operationally configured to contact the ground 5 as a spacer between the raised sidewall 25 and the ground 5. Examples of protective guards include, but are not necessarily limited to metal wear pads, plastic wear pads, rubber wear pads, wood wear pads, textile wear pads, and combinations thereof. In another embodiment, the part of the raised sidewall 25 operationally configured to contact the ground 5 during operation may comprise one or more abrasion and wear resistant coatings.

Figure 19:
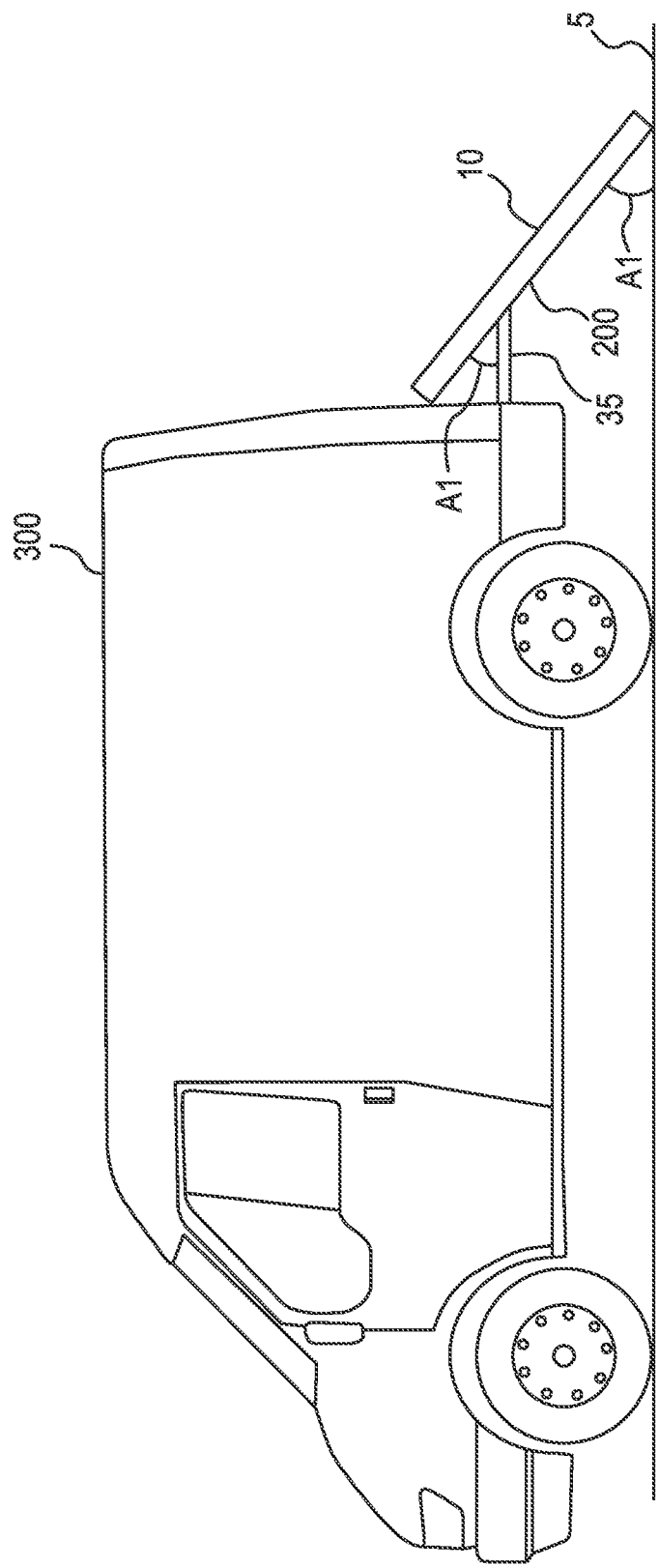
FIG. 19 is a simplified side view illustrating an apparatus of the present disclosure mated to a cargo van.

With reference to FIG. 19, a first mating member 35 configured for use with a female hitch receiver 305 of a cargo van 300 suitably extends out from the second surface 200 of the apparatus 10 forming an angle A1 with the second surface 200 ranging from or about twenty (20.0) degrees to or about forty (40.0) degrees. In one particular embodiment, the first mating member 35 extends out from the second surface 200 forming an angle A1 with the second surface 200 of or about thirty-two (32.0) degrees, which is also the angle formed between the second surface 200 and the ground 5 (herein the "ramp angle"). The angle formed between the first mating member 35 and the second surface 200 is operationally configured to provide the alignment of plane P1 with the near edge 311 of the bed 310 as shown in FIG. 15. As understood by persons of ordinary skill in the art, the angle formed between the first mating member 35 and the second surface 200 may be adjusted to form a different ramp angle for operation with a particular cargo van 300 according to the dimensions of a particular cargo van 300.

Figure 23:
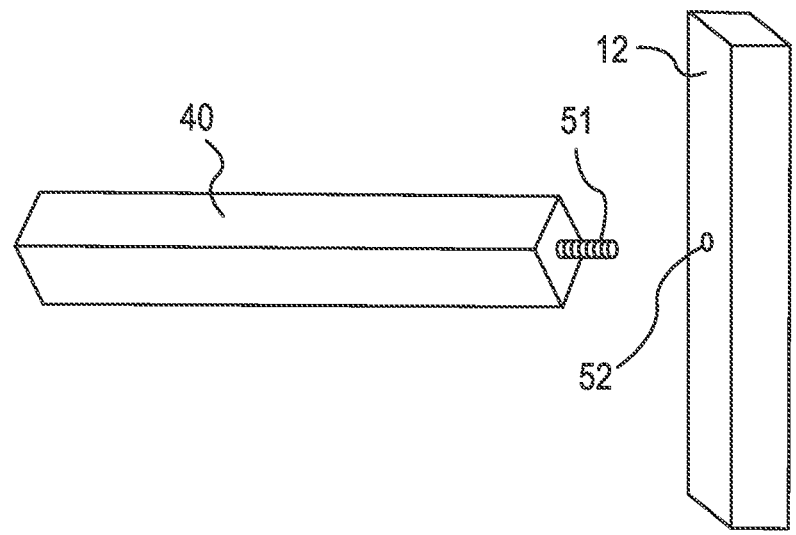
FIG. 23 is a simplified exploded view of a releasably attachable second mating member and part of a first side rail of an apparatus of the present disclosure.
Figure 24:
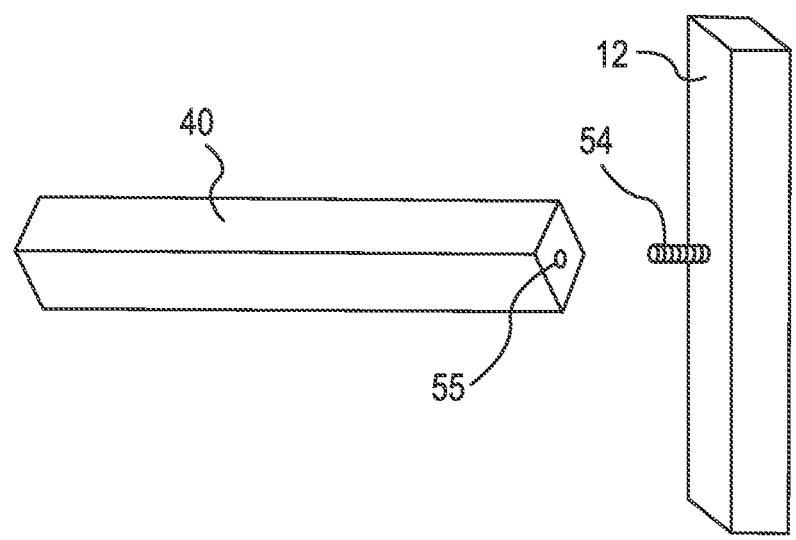
FIG. 24 is a simplified exploded view of a releasably attachable second mating member and part of a first side rail of an apparatus of the present disclosure.

As stated above, the second mating member 40 is operationally configured to mate with a rectangular female hitch receiver 305. As such, similar as the first mating member 35, the second mating member 40 may comprise one or more apertures 41 for receiving a locking pin or the like there through for securing the second mating member 40 to a female hitch receiver 305 (see FIG. 10). Similar as the first mating member 35, the second mating member 40 may also be provided as an elongated four sided rectangular member, i.e., an elongated four sided square member, wherein at least part of the second mating member 40 extends out beyond the outer side or outer surface 23 of first side rail 12 in a second direction relative the first direction of the first mating member 35, wherein the longitudinal center line D-D of the second mating member 40 lies perpendicular to the longitudinal center line A-A of the main body of the apparatus 10. As shown in FIG. 1, in one embodiment a first end of the second mating member 40 may be attached or permanently fixed to the inner surface 15B of the second side rail 14 and a second end of the second mating member 40 may terminate out beyond the first side rail 12 a desired distance as shown—the part of the second mating member 40 extending beyond the first side rail 12 may be referred to herein as a "mating section" of the second mating member 40. As stated above, the part of the second mating member 40 disposed between the side rails 12, 14 may be referred to as a rung section 18B of the second mating member 40 (see rung section 18B in FIG. 12). In an embodiment of the apparatus 10 constructed from one or more metals, the first end of the second mating member 40 may be permanently fixed to the inner surface 15B of the second side rail 14 and a non-terminating part of the second mating member 40 may be permanently fixed to the upper part 12A and lower part 12B of the first side rail 12 via welds. As shown in FIG. 18, in another embodiment a second mating member 40 may be permanently secured to the outer surface 23 of first side rail 12, e.g., via welds or releasably attached to the first side rail 12 as described in reference to FIGS. 23 and 24, and the rung section 18B may be provided as a separate rung of the apparatus 10.

Figure 20:
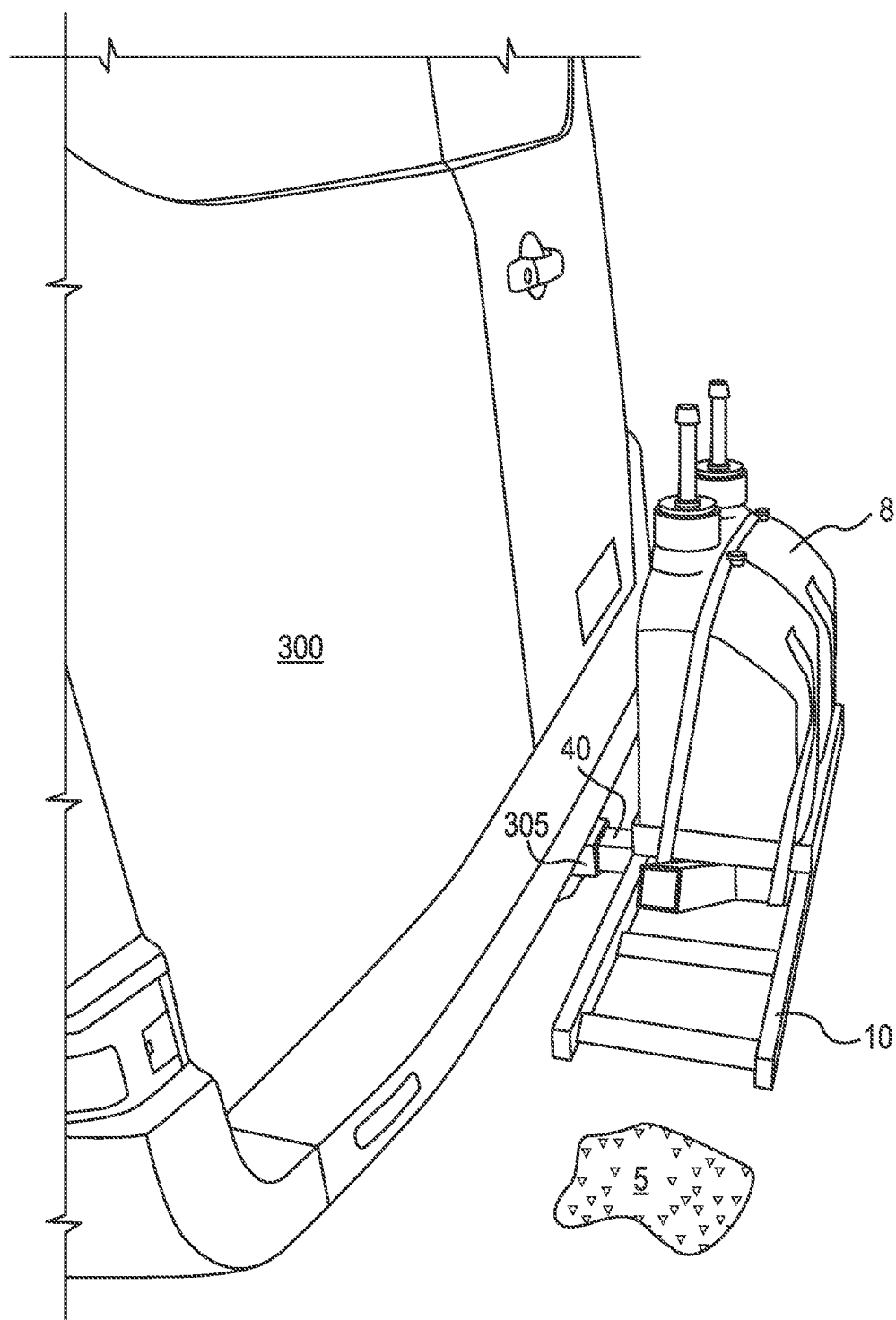
FIG. 20 is a perspective view of the apparatus of FIG. 1 mated to a cargo van including two fuel containers secured to the apparatus via straps.
Figure 21:
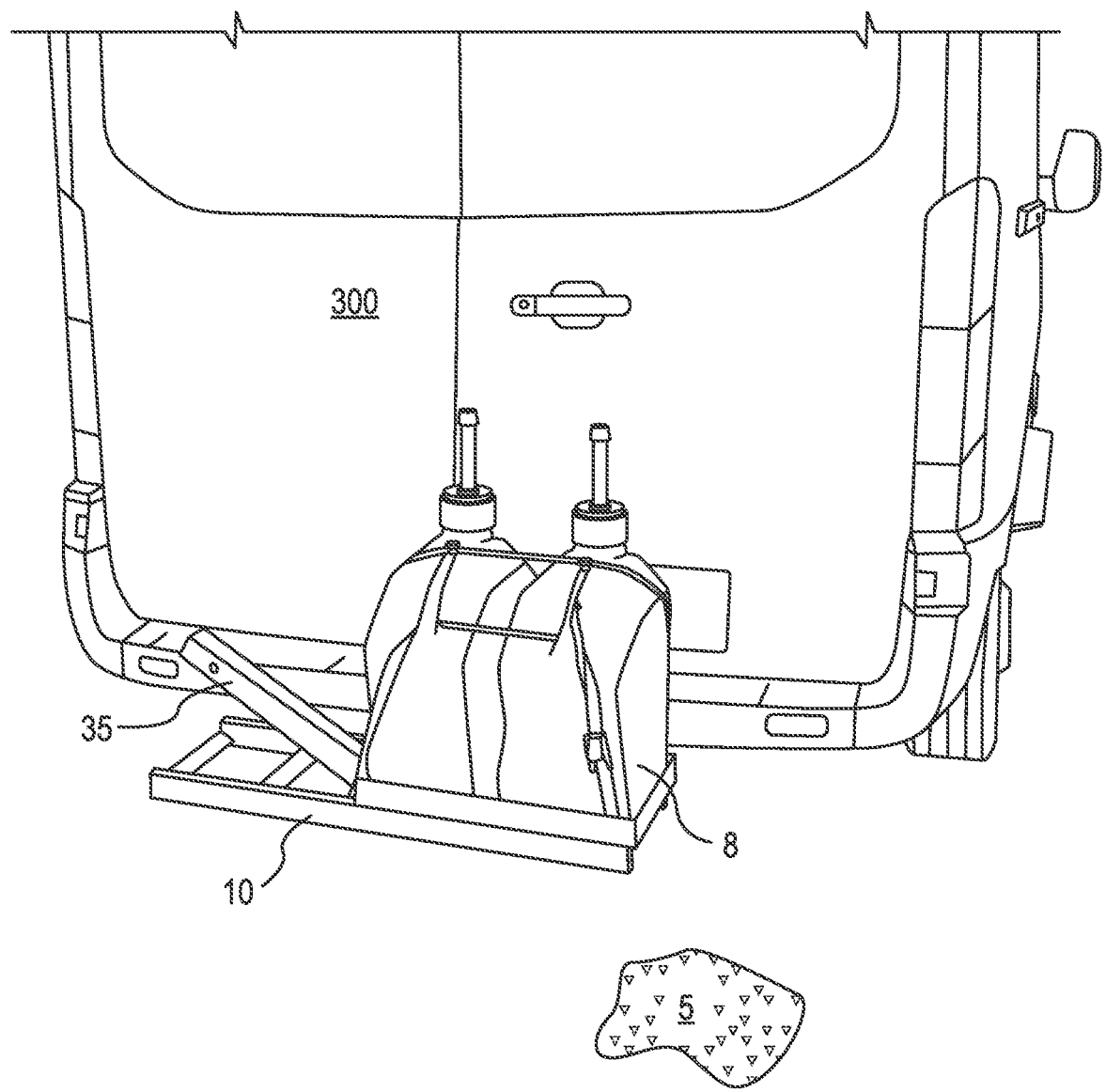
FIG. 21 is a perspective view of the apparatus of FIG. 1 mated to a cargo van including two fuel containers secured to the apparatus via straps.

As shown in FIGS. 20 and 21, when the second mating member 40 is mated with a female hitch receiver 305 of a cargo van 300, the apparatus 10 is set to a "cargo position" (or "cargo carrying position"), which is a horizontal position of the main body, i.e., a horizontal position of the first surface 100 and the second surface 200 in relation to the ground 5. In particular, when the second mating member 40 is mated with a female hitch receiver 305 the second surface 200, i.e., the cargo carrying surface 201, faces upward for supporting one or more cargo items—see the two fuel containers 8 in FIGS. 20 and 21. In this orientation of the apparatus 10, the longitudinal center line A-A of the main body lies perpendicular to the longitudinal center line C-C of the cargo van 300.

Figure 22:
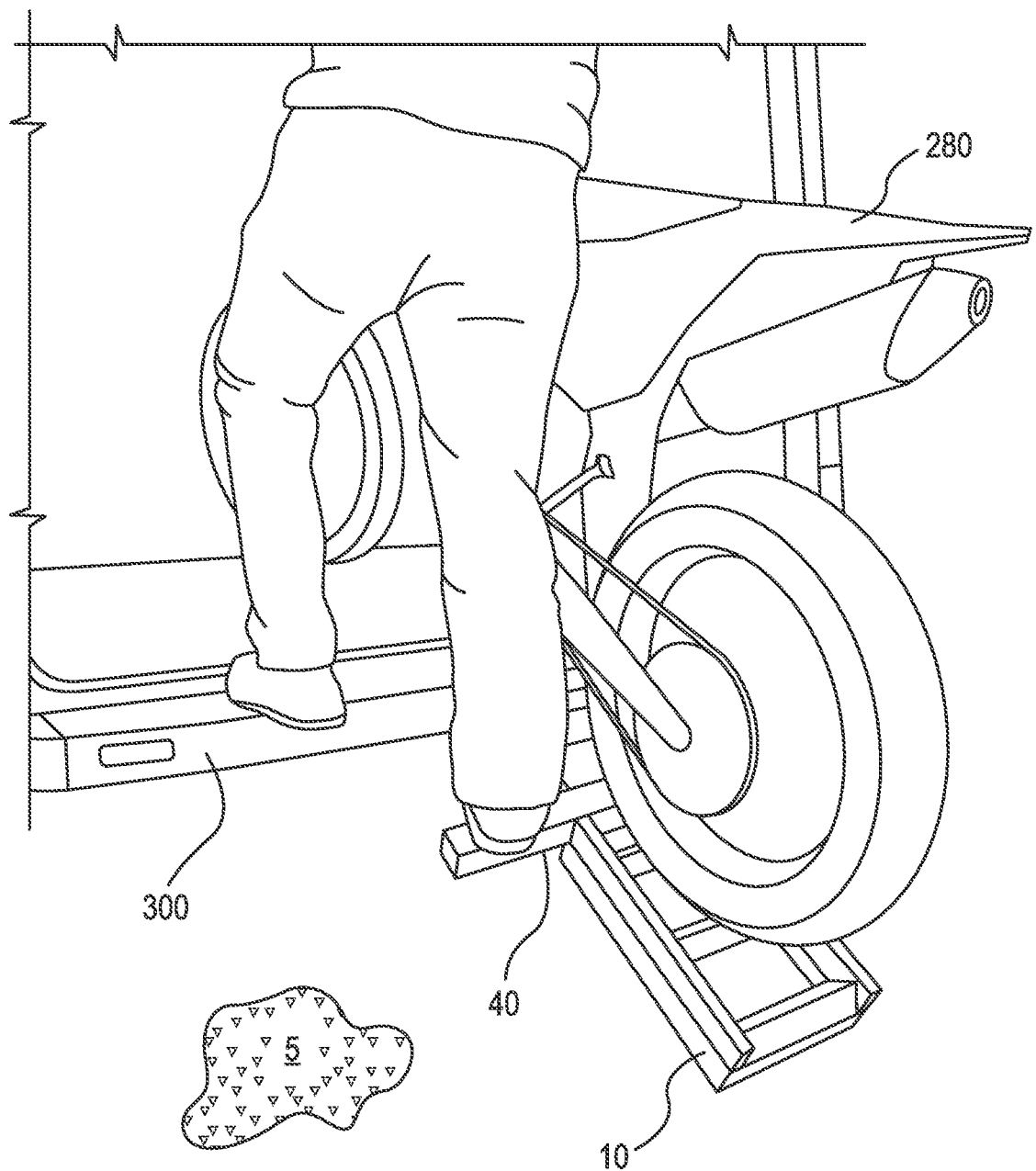
FIG. 22 is a perspective view of the apparatus of FIG. 1 in use as a hitch mount ramp for a cargo van illustrating exemplary manual loading and/or unloading of a motorcycle onto and/or off from the cargo van by an individual.

Turning to FIG. 22, when the apparatus 10 is set to an operable ramp position, the second mating member 40 extends out perpendicular from the main body horizontally relative the ground 5 operationally configured as a third support surface of the apparatus 10, i.e., part of the second mating member 40 is operationally configured as a foot step for assisting persons in loading and unloading a motorcycle 280 in and out of a cargo van 300 as shown. As such, although the length of the second mating member 40 extending out from the main body of the apparatus 10 may vary, the second mating member 40 suitably extends out a length effective as both a foot step and as an attachment for locating the main body of the apparatus 10 a desired distance from a corresponding female hitch receiver 305 when the second mating member 40 is mated to a female hitch receiver 305.

An apparatus 10 of this disclosure is suitably constructed from one or more materials including, but not necessarily limited to, those materials resistant to chipping, cracking, excessive bending and reshaping as a result of weathering, heat, moisture, other outside mechanical and chemical influences, as well as impacts to the apparatus 10. Particular materials of construction may include, but are not necessarily limited to one or more metals, one or more plastics, one or more rubbers, one or more filled composite materials, one or more woods, and combinations thereof, depending on the performance specifications for one or more particular uses of the apparatus 10. Suitable metals include, but are not necessarily limited to steel, stainless steel, nickel alloy, aluminum, titanium, magnesium alloy, and combinations thereof. Suitable plastics include, but are not necessarily limited to thermoplastics such as polyvinyl chloride ("PVC"), chlorinated polyvinyl chloride ("CPVC"), UHMW polyethylene, high density polyethylene ("HDPE"), low density polyethylene ("LDPE"), polypropylene, polyoxymethylene (also known as acetal plastic), polycarbonates, poly(methyl methacrylate) and combinations thereof.

In an embodiment wherein the apparatus 10 is constructed from one or more metals, individual component parts may be welded together. In another embodiment, individual component parts of the apparatus 10 may be releasably secured together via fasteners, e.g., threaded fasteners. In still another embodiment, individual components parts of the apparatus 10 may be assembled via one or more adhesives. In another embodiment, an apparatus 10 constructed from one or more materials as described above may be provided as a one-piece member, e.g., machine formed, formed via a mold, formed via 3-D printing. The apparatus 10 may also be provided in one or more colors, e.g., one or more colors added to the outer surface of the apparatus 10 via wet paint, powder coat, stain. In another embodiment, an apparatus 10 may be constructed from one or more materials of a desired one or more colors. Likewise, the apparatus 10 may include reflector tape or the like. One or more of the rungs 18 and/or the second mating member 40 may also include anti-slip grip tape or the like as understood by the skilled artisan.

The apparatus 10 may also include one or more removable couplings operationally configured to interconnect the first mating member 35 and/or the second mating member 40 to the female hitch receiver 305. In one embodiment, one or more removable couplings may be configured to orient the apparatus 10 at an operating angle as described above, i.e., when an apparatus 10 is to be set on uneven ground 5 or on ground 5 that is not level. In another embodiment, a coupling may be employed to increase or extend the distance between the main body of the apparatus 10 and a target vehicle during use. A suitable coupling may include a pipe type coupling, e.g., a fixed or flexible coupling, for interconnecting the first mating member 35 and/or the second mating member 40 with a female hitch receiver 305 using apertures along the coupling and locking pins or the like as described above.

In another embodiment, the first mating member 35 and/or the second mating member 40 may be releasably attached to the main body of the apparatus 10 via threaded connectors. For example, see the threaded male connector 51 of the second mating member 40 operationally configured to mate with a female threaded surface 52 of the first side rail 12 in FIG. 23. Also, see the threaded male connector 54 of the first side rail 12 operationally configured to mate with a female threaded surface 55 of a second mating member 40 in FIG. 24. In another embodiment, a second mating member 40 may be secured to a first side rail 12, or a second side rail 14, via a clamp or the like.

Figure 25:
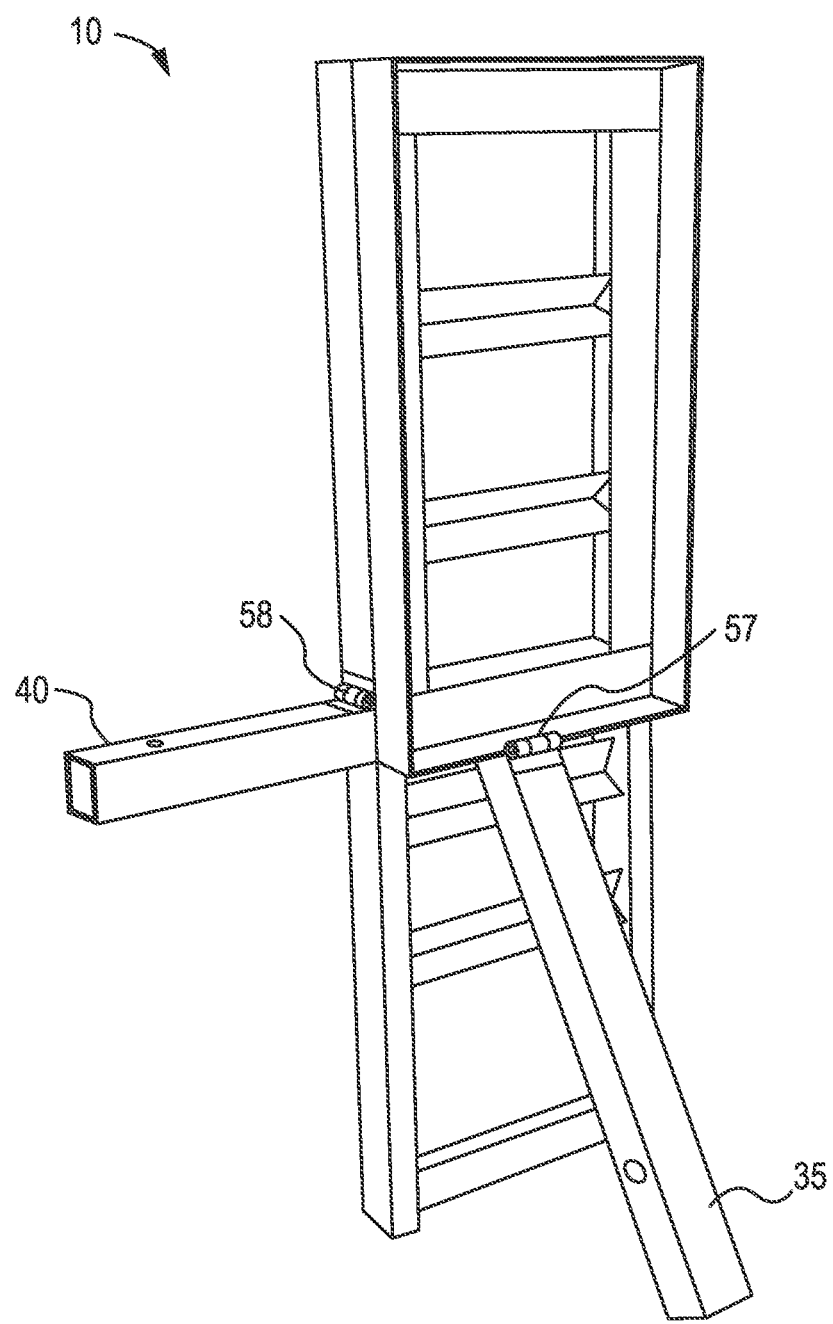
FIG. 25 is a perspective view of another embodiment of an apparatus of the present disclosure.

It is further contemplated that for commercial enterprises an apparatus 10 of this disclosure may be provided in one or more of the following configurations: (1) an apparatus 10 as shown in FIG. 1, (2) an apparatus 10 as shown in FIG. 11 or similar, (3) an apparatus 10 having only a main body and a first mating member 35, (4) an apparatus 10 having only a main body and a second mating member 40, (5) an apparatus 10 having only a main body, a second mating member 40 and a cargo carrying surface, (6) an apparatus as shown in FIG. 25 as described below. An apparatus 10 of this disclosure may also be provided with a single mating member releasably attachable to the main body of the apparatus 10 via male/female connections wherein the single mating member is interchangeable as a first mating member 35 and a second mating member 40.

Figure 26:
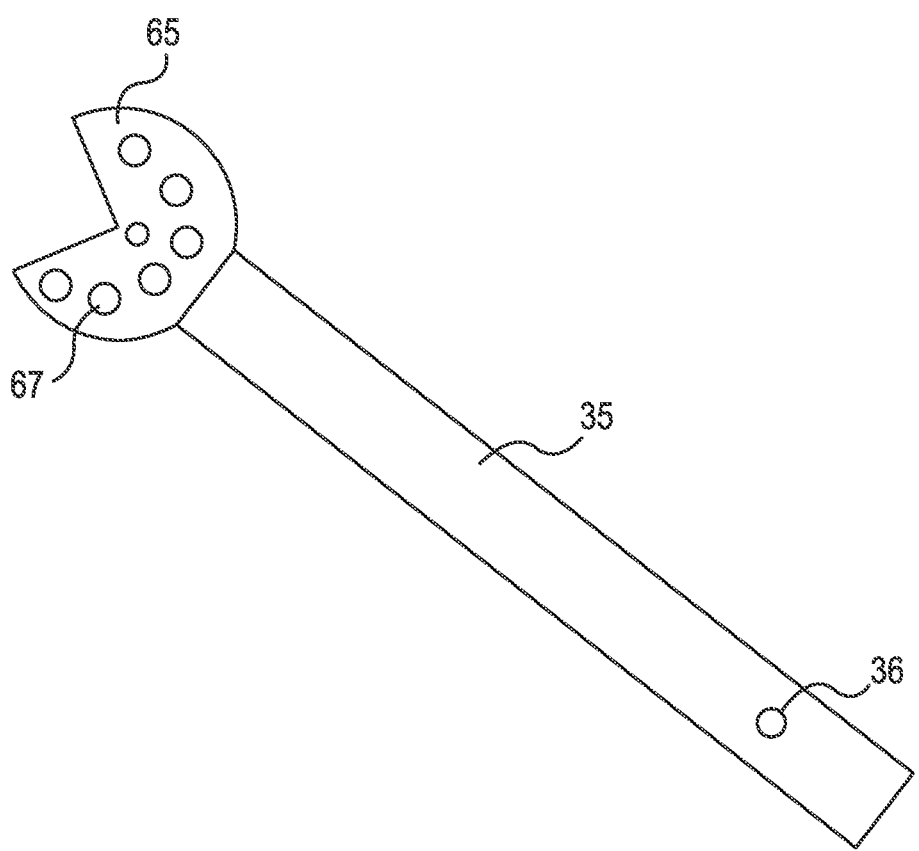
FIG. 26 is a perspective view of an angle adjustment system of an apparatus of the present disclosure.

With reference to FIG. 25, the first mating member 35 and the second mating member 40 may be attached to the main body via hinges 57, 58 or the like. Hinged connections are suitably configured so that the first mating member 35 and the second mating member 40 may fold to make the apparatus 10 more compact for storage. Also, a hinged connection of the first mating member 35 may be operationally configured to alter the angle A1 as desired for operation of the apparatus 10 with one or more types of vehicles, including one or more future makes and models of vehicles, that may vary in regard to the location of a female hitch receiver and a near edge of a bed of the vehicle. As shown in FIG. 26, in another embodiment, the first mating member 35 may be provided as part of an angle adjustment system including a multi-point adjustment member 65 interconnecting the main body of the apparatus 10 and the first mating member 35. In this embodiment, the first mating member 35 includes an aperture operationally configured to be aligned with two or more apertures 67 of the multi-point adjustment member 65 whereby a locking pin or the like may be set through aligned apertures in a manner effective to hold the first mating member 35 at a fixed angle in relation to the main body of the apparatus 10. Without limiting the angle adjustment system, in one embodiment the multi-point adjustment member 65 may include two or more apertures 67 effective to set the angle A1 from about twenty (20.0) degrees to about forty (40.0) degrees.

The invention will be better understood with reference to the following non-limiting examples, which are illustrative only and not intended to limit the present invention to a particular embodiment.

Example 1

Figure 27:
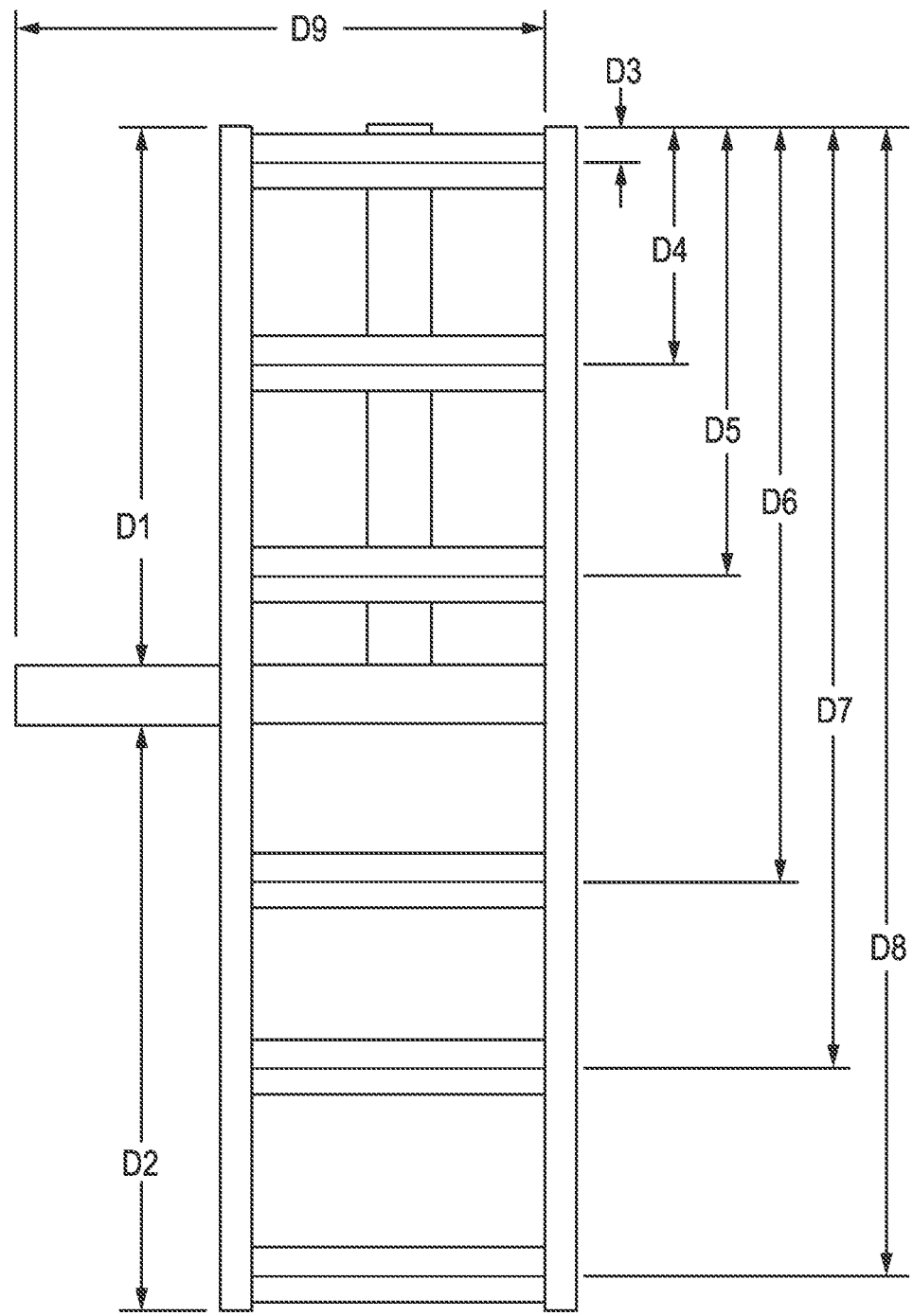
FIG. 27 is a top view of an embodiment of an apparatus of the present disclosure.
Figure 28:
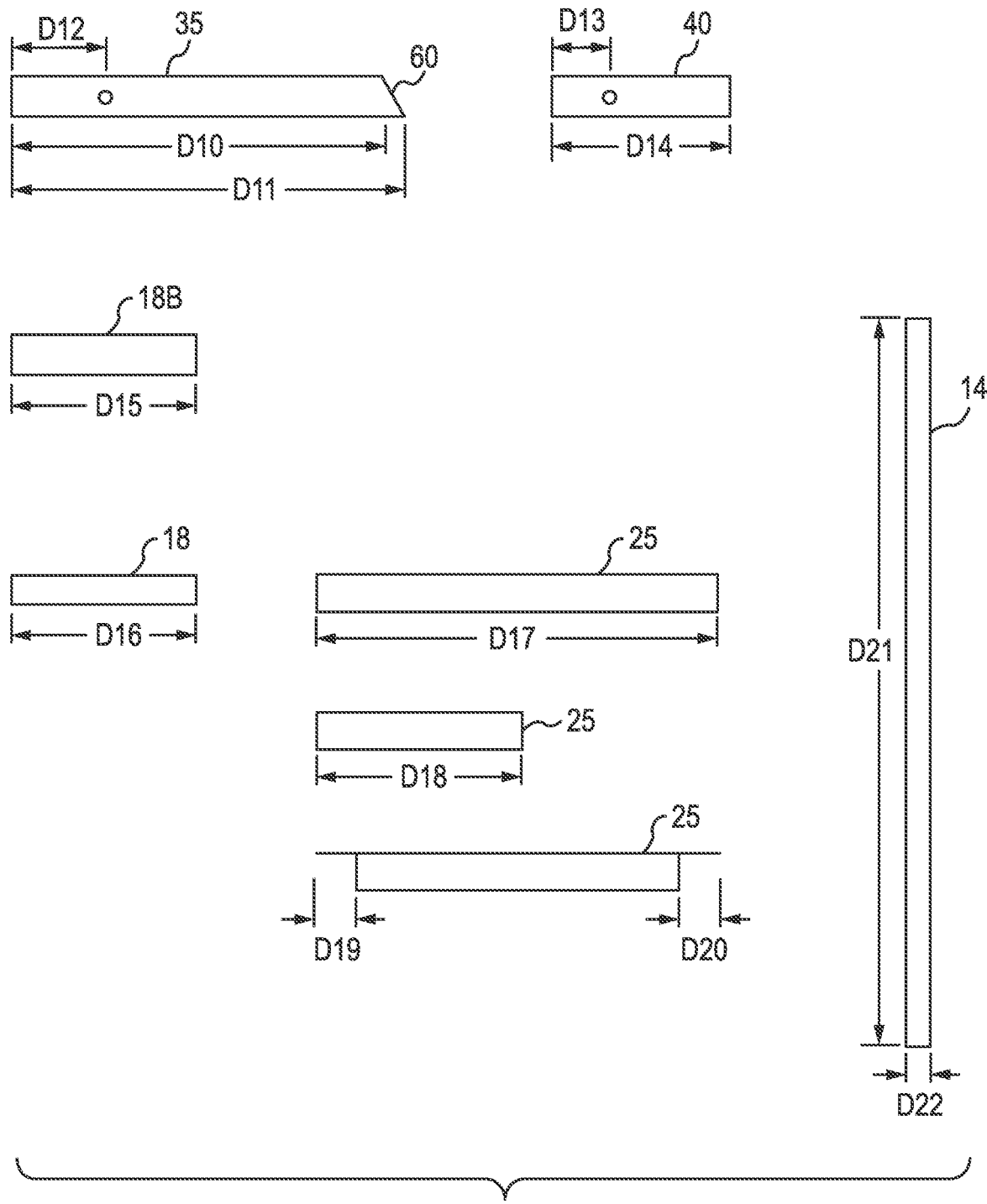
FIG. 28 is a depiction of various parts of the apparatus of FIG. 27.

In a first non-limiting example, with reference to FIGS. 27 and 28, an apparatus 10 constructed from aluminum and having a total weight of or about 5.9 grams (13.0 pounds) is provided having the dimensions as shown in Table 1:

TABLE 1

| | |
|---|---|
| D1: | 41.9 cm (16.5 inches); |
| D2: | 46.99 cm (18.5 inches); |
| D3: | 2.86 cm (1.125 inches); |
| D4: | 19.1 cm (7.5 inches); |
| D5: | 35.6 cm (14.0 inches); |
| D6: | 59.1 cm (23.25 inches); |
| D7: | 74.9 cm (29.5 inches); |
| D8: | 90.8 cm (35.75 inches); |
| D9: | 50.8 cm (20.0 inches); |
| D10: | 46.7 cm (18.375 inches); |
| D11: | 49.5 cm (19.5 inches); |
| D12: | 11.43 cm (4.5 inches); |
| D13: | 7.62 cm (3.0 inches); |
| D14: | 22.9 cm (9.0 inches) - mating section of the second mating member 40; |
| D15: | 25.4 cm (10.0 inches) - rung section of the second mating member 40; |
| D16: | 25.4 cm (10.0 inches); |
| D17: | 52.1 cm (20.5 inches); |
| D18: | 30.5 cm (12.0 inches); |
| D19: | 5.08 cm (2.0 inches); |
| D20: | 5.08 cm (2.0 inches); |

TABLE 1-continued

D21: 93.98 cm (37.0 inches);
D22: 2.54 cm (1.0 inches).

The apparatus 10 also includes the following dimensions:
Dimensions of the hollow rectangular first mating member 35 and hollow second mating member 40:
5.08×5.08×0.32 cm (2.0×2.0×0.125 inches);
Dimensions of the hollow rectangular first and second side rails 12 and 14:
5.08×2.54×0.32 cm (2.0×1.0×0.125 inches);
Dimensions of the angled rungs 18:
3.81×3.81×0.32 cm (1.5×1.5×0.125 inches);
Dimensions of the individual angled sidewall 25 members:
5.08×5.08×0.32 cm (2.0×2.0×0.125 inches);
Surface 60 of the proximal end of first mating member 35: 32.0 degree angled surface.

Example 2

In a second non-limiting example, an apparatus 10 as shown in FIGS. 1 and 2 may be described according to the following three paragraphs.

An apparatus for use with a vehicle having a flatbed support surface and a hitch receiver, the apparatus comprising:
 a first support surface configured as a ramp surface for wheeled vehicles;
 a second support surface configured as a cargo carrier surface;
 a first mating member for mating the apparatus with the hitch receiver for use of the apparatus as a ramp for wheeled vehicles; and
 a second mating member for mating the apparatus with the hitch receiver for use of the apparatus as a cargo carrier;
 wherein the second mating member comprises a third support surface operationally configured as a foot step when the first connector is mated with the hitch receiver.

An apparatus for use with a vehicle having a flatbed support surface and a female hitch receiver, the apparatus comprising:
 a first ramp surface;
 a second cargo surface;
 a first mating member for securing the apparatus to the female hitch receiver; and
 a second mating member for securing the apparatus to the female hitch receiver;
 wherein mating of the first mating member to the hitch receiver orients the apparatus for use as a ramp and wherein mating of the second mating member orients the apparatus for use as a cargo holder.

A hitchable apparatus for use with a hitch receiver of a vehicle comprising:
 a main body including a first support surface operationally configured as a ramp surface for one or more wheeled vehicles; and a second support surface operationally configured as a cargo carrier surface;
 a first mating member extending out from the main body in a first direction for releasably securing the apparatus to the hitch receiver; and
 a second mating member extending out from the main body in a second direction for releasably securing the apparatus to the hitch receiver.

Although the present disclosure is described above in terms of various exemplary embodiments and implementations, it should be understood that the various features and functionality described in one or more of the individual embodiments are not limited in their applicability to the particular embodiment with which they are described, but instead might be applied, alone or in various combinations, to one or more other embodiments whether or not such embodiments are described and whether or not such features are presented as being a part of a described embodiment, Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like.

Persons of ordinary skill in the art will recognize that many modifications may be made to the present disclosure without departing from the spirit and scope of the disclosure. The embodiment(s) described herein are meant to be illustrative only and should not be taken as limiting the invention, which is defined in the claims.

I claim:

1. An apparatus for use with a vehicle having a flatbed support surface and a hitch receiver, the apparatus comprising:
 a main body including a first side defining a first support surface operationally configured as a ramp surface for wheeled vehicles and an opposing second side defining a second support surface operationally configured as a cargo carrier surface;
 a first mating member for mating the apparatus with the hitch receiver for use of the apparatus as a ramp for wheeled vehicles; and
 a second mating member for mating the apparatus with the hitch receiver for use of the apparatus as a cargo carrier;
 wherein the second mating member comprises a third support surface operationally configured as a foot step when the first mating member is mated with the hitch receiver; and
 wherein mating of the first mating member to the hitch receiver orients the first side of the main body for use as the ramp surface and wherein mating of the second mating member to the hitch receiver orients the second side of the main body for use as the cargo carrier surface.

2. The apparatus of claim 1 wherein the second support surface includes one or more raised sidewalls defining a perimeter of the cargo carrier surface.

3. The apparatus of claim 1 wherein the main body comprises opposing elongated side rails and one or more elongated rungs disposed perpendicular to and interconnecting the side rails.

4. The apparatus of claim 3 wherein at least part of the second mating member is operationally configured as a rung of the main body of the apparatus.

5. The apparatus of claim 4 wherein the first mating member extends out from the second support surface forming an angle with the second support surface of 40.0 degrees.

6. The apparatus of claim 3 wherein the opposing elongated side rails comprise a first side rail and a second side rail, wherein at least part of the second mating member extends out beyond an outer surface of the second side rail.

7. The apparatus of claim 3 wherein each of the one or more elongated rungs comprises an L-angle configuration.

8. The apparatus of claim 1 wherein at least part of the first mating member is attached to the second mating member.

9. The apparatus of claim 2 wherein at least part of the first mating member is attached to the one or more raised sidewalls.

10. An apparatus for use with a vehicle having a flatbed support surface and a female hitch receiver, the apparatus comprising:
- a main body comprising a first side and an opposing second side;
- a first mating member for securing the apparatus to the female hitch receiver; and
- a second mating member for securing the apparatus to the female hitch receiver;
- wherein mating of the first mating member to the hitch receiver orients the apparatus for use of the first side of the main body as a ramp and wherein mating of the second mating member to the hitch receiver orients the apparatus for use of the second side of the main body as a cargo holder.

11. The apparatus of claim 10 wherein the first mating member extends out from the second side of the main body.

12. The apparatus of claim 11 wherein the main body comprises a first side rail and an opposing second side rail and one or more elongated rungs disposed perpendicular to and interconnecting the first and second side rails and wherein at least part of the second mating member extends out beyond an outer surface of the second side rail parallel to the one or more elongated rungs.

13. A hitchable apparatus for use with a hitch receiver of a vehicle comprising:
- a main body including a first side defining a first support surface operationally configured as a ramp surface for one or more wheeled vehicles; and an opposing second side defining a second support surface operationally configured as a cargo carrier surface;
- a first mating member extending out from the main body in a first direction for releasably securing the apparatus to the hitch receiver; and
- a second mating member extending out from the main body in a second direction for releasably securing the apparatus to the hitch receiver;
- wherein mating of the first mating member to the hitch receiver orients the first side of the main body for use as the ramp surface and wherein mating of the second mating member to the hitch receiver orients the second side of the main body for use as the cargo carrier surface.

14. The hitchable apparatus of claim 13 wherein the second mating member comprises a third support surface operationally configured as a foot step when the first mating member is mated with the hitch receiver.

15. The hitchable apparatus of claim 13 wherein the main body comprises a first side rail and an opposing second side rail and one or more elongated rungs disposed perpendicular to and interconnecting the first and second side rails and wherein at least part of the second mating member extends out beyond an outer surface of the second side rail operationally configured as a foot step when the first mating member is mated to the hitch receiver.

16. The apparatus of claim 1 wherein the first mating member includes a first aperture there through and the second mating member includes a second aperture there through.

17. The apparatus of claim 12 wherein when the first mating member is mated to the hitch receiver then the part of the second mating member that extends out beyond the outer surface of the second side rail is operationally configured as a foot step.

* * * * *